US012008965B2

(12) United States Patent
Jung et al.

(10) Patent No.: US 12,008,965 B2
(45) Date of Patent: Jun. 11, 2024

(54) DISPLAY PANEL AND DISPLAY DEVICE USING THE SAME

(71) Applicant: LG Display Co., Ltd., Seoul (KR)

(72) Inventors: Jin Woo Jung, Paju-si (KR); Sang Jin Nam, Paju-si (KR)

(73) Assignee: LG Display Co., Ltd., Seoul (KR)

(*) Notice: Subject to any disclaimer, the term of this patent is extended or adjusted under 35 U.S.C. 154(b) by 61 days.

(21) Appl. No.: 17/395,345

(22) Filed: Aug. 5, 2021

(65) Prior Publication Data

US 2022/0101798 A1 Mar. 31, 2022

(30) Foreign Application Priority Data

Sep. 28, 2020 (KR) ........................ 10-2020-0126163

(51) Int. Cl.
*G09G 3/3275* (2016.01)
*G09G 3/3233* (2016.01)

(52) U.S. Cl.
CPC ......... *G09G 3/3275* (2013.01); *G09G 3/3233* (2013.01); *G09G 2300/0426* (2013.01); *G09G 2300/0439* (2013.01); *G09G 2310/027* (2013.01); *G09G 2320/0233* (2013.01); *G09G 2320/0276* (2013.01); *G09G 2330/028* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,418,434 | B2 | 9/2019 | Kim et al. | |
| 10,748,486 | B2 | 8/2020 | Teraguchi | |
| 10,756,136 | B1 | 8/2020 | Ma et al. | |
| 11,082,547 | B2 | 8/2021 | Xu et al. | |
| 11,094,772 | B2 | 8/2021 | Ma et al. | |
| 11,282,460 | B2 | 3/2022 | Teraguchi | |
| 11,527,592 | B2 * | 12/2022 | Shan | H01L 27/3216 |
| 2014/0168194 | A1 * | 6/2014 | Kong | G09G 3/3233 345/212 |
| 2014/0320545 | A1 * | 10/2014 | Jeon | G09G 3/3233 345/82 |

(Continued)

FOREIGN PATENT DOCUMENTS

| | | | |
|---|---|---|---|
| CN | 103871362 | A | 6/2014 |
| CN | 107358916 | A | 11/2017 |

(Continued)

OTHER PUBLICATIONS

Japan Patent Office, Office Action, JP Patent Application No. 2021-136787, dated Aug. 25, 2022, seven pages.

(Continued)

*Primary Examiner* — Michael A Faragalla
(74) *Attorney, Agent, or Firm* — Fenwick & West LLP

(57) ABSTRACT

The present disclosure relates to a display panel and a display device using the same, and includes a second pixel area in which pixels having a resolution or pixels per inch (PPI) lower than that of a first pixel area are arranged. A data voltage of pixel data to be written to a pixel in the second pixel area is applied to a first gate electrode of a driving element disposed in the second pixel area. A compensation voltage for increasing luminance of the second pixel area is applied to a second gate electrode of the driving element.

19 Claims, 29 Drawing Sheets

CA

(56) References Cited

U.S. PATENT DOCUMENTS

| | | | | |
|---|---|---|---|---|
| 2016/0042694 | A1* | 2/2016 | Lim | G09G 3/3233 345/78 |
| 2017/0288003 | A1 | 10/2017 | Kim et al. | |
| 2017/0365224 | A1 | 12/2017 | Okamoto | |
| 2018/0130418 | A1 | 5/2018 | Zhu et al. | |
| 2018/0144719 | A1* | 5/2018 | Lee | G09G 3/006 |
| 2018/0218690 | A1* | 8/2018 | Zhou | G09G 3/3406 |
| 2018/0330672 | A1* | 11/2018 | Park | G09G 3/3266 |
| 2019/0019458 | A1 | 1/2019 | Teraguchi | |
| 2019/0237518 | A1* | 8/2019 | Sun | H01L 27/3218 |
| 2019/0318685 | A1* | 10/2019 | Park | G09G 3/32 |
| 2020/0013849 | A1 | 1/2020 | Kim et al. | |
| 2020/0195764 | A1 | 6/2020 | Xu et al. | |
| 2020/0342814 | A1 | 10/2020 | Teraguchi | |
| 2021/0013298 | A1 | 1/2021 | Her et al. | |
| 2021/0065620 | A1* | 3/2021 | Yang | G09G 3/3208 |
| 2021/0066427 | A1 | 3/2021 | Ma et al. | |
| 2021/0074192 | A1* | 3/2021 | Zhou | G09G 3/006 |
| 2022/0327997 | A1 | 10/2022 | Liu et al. | |

FOREIGN PATENT DOCUMENTS

| | | | |
|---|---|---|---|
| CN | 110061014 | A | 7/2019 |
| CN | 110379356 | A | 10/2019 |
| CN | 111292687 | A | 6/2020 |
| JP | 2009-069571 | A | 4/2009 |
| JP | 2020-526972 | A | 8/2020 |
| KR | 10-2017-0114026 | A | 10/2017 |
| KR | 10-2019-0119960 | A | 10/2019 |
| WO | WO 2017/221584 | A1 | 12/2017 |

OTHER PUBLICATIONS

Extended European Search Report, European Patent Application No. EP 21190001.4, dated Feb. 4, 2022, 9 pages.

China National Intellectual Property Administration, Office Action, CN Patent Application No. 202110937827.5, dated Dec. 18, 2023, 22 pages.

* cited by examiner

DISPLAY PANEL AND DISPLAY DEVICE USING THE SAME

CROSS-REFERENCE TO RELATED APPLICATION

This application claims priority to and the benefit of Republic of Korea Patent Application No. 10-2020-0126163, filed Sep. 28, 2020, the disclosure of which is hereby incorporated by reference in its entirety.

BACKGROUND

1. Field

The present disclosure relates to a display panel having partially different resolution or pixels per inch (PPI), and a display device using the same.

2. Discussion of Related Art

Electroluminescent display devices are roughly classified into inorganic light emitting display devices and organic light emitting display devices depending on the material of an emission layer. The organic light emitting display device of an active matrix type includes an organic light emitting diode (hereinafter, referred to as "OLED") that emits light by itself, and has an advantage in that the response speed is fast and the luminous efficiency, luminance, and viewing angle are large. In the organic light emitting display device, the OLED is formed in each pixel. The organic light emitting display device has a fast response speed, excellent luminous efficiency, luminance, and viewing angle, and has excellent contrast ratio and color reproducibility since it can express black gradations in complete black.

Multi-media functions of mobile terminals have been improved. For example, a camera is built into a smartphone by default, and the resolution of the camera is increasing to the level of a conventional digital camera. A front camera of the smartphone restricts a screen design, making it difficult to design the screen. In order to reduce a space occupied by the camera, a screen design including a notch or punch hole has been adopted in the smartphone, but the screen size is still limited due to the camera, making it impossible to implement a full-screen display.

SUMMARY

In order to implement a full-screen display, a sensing area in which low-resolution pixels are arranged may be provided in the screen of a display panel. Since the number of pixels illuminated in such a sensing area is relatively small, the pixels in the sensing area may be driven by a relatively high voltage for luminance uniformity on the entire screen. In this case, since a data voltage needs to be higher in order to increase the luminance of the low-resolution region, the voltage range is required to be extended, and thus a data voltage margin may decrease and the cost of a circuit for generating a gamma reference voltage may increase.

An object of the present disclosure is to solve the above-mentioned needs and/or problems.

The present disclosure provides a display panel capable of implementing a full-screen display and achieving uniform luminance on the entire screen without decreasing a data voltage margin, and a display device using the same.

It should be noted that objects of the present disclosure are not limited to the above-described objects, and other objects of the present disclosure will be apparent to those skilled in the art from the following descriptions.

A display panel according to an embodiment of the present disclosure includes a first pixel area in which pixels are arranged, and a second pixel area in which pixels having a resolution or pixels per inch (PPI) lower than that of the first pixel area are arranged.

Each of the pixels in the first pixel area includes a first driving element configured to drive a light emitting element. Each of the pixels in the second pixel area includes a second driving element configured to drive a light emitting element.

The second driving element includes first and second gate electrodes. A data voltage of pixel data to be written to the pixel of the second pixel area is applied to the first gate electrode of the second driving element.

A compensation voltage for increasing luminance of the second pixel area is applied to the second gate electrode of the second driving element.

A display device according to an embodiment of the present disclosure includes the display panel; a data driver configured to convert pixel data of an input image into a data voltage and supply the data voltage to data lines connected to the pixels in the first and second pixel areas; and a luminance compensation unit configured to generate the compensation voltage.

In the present disclosure, since a sensor is disposed on a screen on which an image is displayed, a full-screen display can be implemented.

In the present disclosure, the driving element for driving light emitting elements in a low resolution or low PPI region is implemented as a transistor of a double gate structure, and the compensation voltage for increasing the luminance of the pixel is applied to the second gate electrode of the driving element, thereby improving luminance uniformity on a screen having different resolutions or PPIs for each area.

In the present disclosure, by securing a voltage margin without extending the voltage range of a data voltage applied to the pixels in the low resolution or low PPI region, the luminance deviation of sub-pixels can be optically compensated with high resolution, thereby improving the accuracy of optical compensation and securing a data voltage variable range for compensating for image quality according to changes over time.

Effects which can be achieved by the present disclosure are not limited to the above-mentioned effects. That is, other objects that are not mentioned may be obviously understood by those skilled in the art to which the present disclosure pertains from the following description.

BRIEF DESCRIPTION OF THE DRAWINGS

The above and other objects, features, and advantages of the present disclosure will become more apparent to those of ordinary skill in the art by describing exemplary embodiments thereof in detail with reference to the attached drawings, in which.

DETAILED DESCRIPTION

Figure 1:
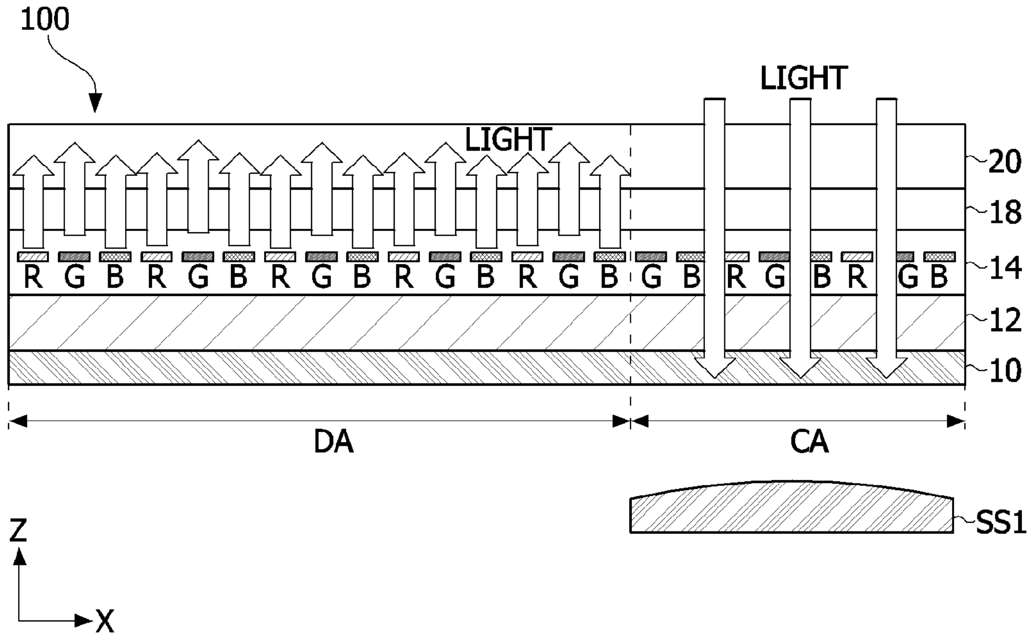
FIG. 1 is a cross-sectional view schematically showing a display panel according to an embodiment of the present disclosure.

Advantages and features of the present disclosure, and a method of achieving them will become apparent with reference to the embodiments described below in detail together with the accompanying drawings. However, the present disclosure is not limited to the embodiments disclosed below, but will be implemented in a variety of different forms. However, the present embodiments are provided to complete the present disclosure, and to fully inform the scope of the invention to those of ordinary skill in the art to which the present disclosure pertains, and the present disclosure is only defined by the scope of the claims.

The shapes, sizes, ratios, angles, numbers, and the like disclosed in the drawings for explaining the embodiments of the present disclosure are exemplary, and thus the present disclosure is not limited to the illustrated matters. The same reference numerals used herein refer to the same components. In addition, in describing the present disclosure, when it is determined that a detailed description of a related known technique may unnecessarily obscure the subject matter of the present disclosure, the detailed description thereof will be omitted.

When terms such as “include”, “have”, and “comprise” are used herein, other parts may be added unless “only” is used. In the case of expressing the components in the singular, it includes the case of including the plural unless specifically stated otherwise.

In interpreting the components, it is interpreted as including an error range even if there is no explicit description.

In the case of a description of the positional relationship, for example, if the positional relationship of two parts is described as terms such as “on~”, “above~”, “below~”, and “beside~”, one or more other parts may be located between the two parts unless “right”, or “directly” is used.

In the description of the embodiments, first, second, and the like are used to describe various components, but these components are not limited by these terms. These terms are only used to distinguish one component from another component. Accordingly, a first component mentioned below may be a second component within the technical spirit of the present disclosure.

The same reference numerals used herein refer to the same components.

Features of the various embodiments may be partially or entirely coupled or combined with each other, various interlocking and driving are technically possible, and the embodiments may be implemented independently of each other or may be implemented together in a related relationship.

In a display device of the present disclosure, a pixel circuit may include a plurality of transistors. The transistors may be implemented as an oxide thin film transistor (TFT) including an oxide semiconductor, a low temperature polysilicon (LTPS) TFT including the LTPS, or the like. Each of the transistors may be implemented as a p-channel TFT or an n-channel TFT.

The transistor is a three-electrode element including a gate, a source, and a drain. The source is an electrode that supplies carriers to the transistor. In the transistor, the carriers start flowing from the source. The drain is an electrode through which the carriers exit from the transistor. In the transistor, the carriers flow from the source to the drain. In the case of an n-channel transistor, since the carriers are electrons, a source voltage is lower than a drain voltage so that the electrons can flow from the source to the drain. In the n-channel transistor, a current flows from the drain to the source. In the case of a p-channel transistor (PMOS), since the carriers are holes, the source voltage is higher than the drain voltage so that the holes can flow from the source to the drain. In the p-channel transistor, since the holes flow from the source to the drain, a current flows from the source to the drain. It should be noted that the source and drain of the transistor are not fixed. For example, the source and the drain may be changed according to an applied voltage. Therefore, the present disclosure is not limited due to the source and drain of the transistor. In the following description, the source and drain of the transistor will be referred to as first and second electrodes.

A gate signal swings between a gate-on voltage and a gate-off voltage. The gate-on voltage is set to a voltage higher than the threshold voltage of the transistor, and the gate-off voltage is set to a voltage lower than the threshold voltage of the transistor. The transistor is turned on in response to the gate-on voltage, while it is turned off in response to the gate-off voltage. In the case of the n-channel transistor, the gate-on voltage may be a gate high voltage VGH/VEH, and the gate-off voltage may be a gate low voltage VGL/VEL. In the case of the p-channel transistor, the gate-on voltage may be the gate low voltage VGL/VEL, and the gate-off voltage may be the gate high voltage VGH/VEH.

Hereinafter, various embodiments of the present disclosure will be described in detail with reference to the accompanying drawings.

Figure 2:
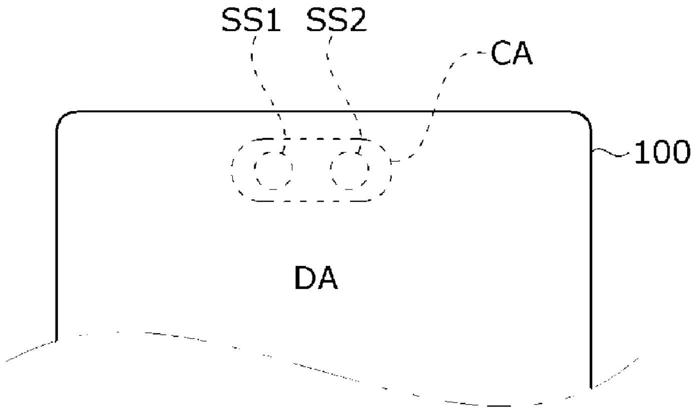
FIG. 2 is a plan view showing an area in which a sensor module is disposed in a screen of a display panel according to an embodiment of the present disclosure.

Referring to FIGS. 1 and 2, a display panel 100 includes a screen for reproducing an input image. The screen may be divided into a first pixel area DA and a second pixel area CA having different resolutions.

Each of the first pixel area DA and the second pixel area CA includes a pixel array in which pixels to which pixel data of the input image is written are arranged. The second pixel area CA may be a pixel area having a resolution less than that of the first pixel area DA. The pixel array of the first pixel area DA may include pixels arranged with high pixels per inch (PPI). The pixel array of the second pixel area CA may include pixels arranged with low PPI.

As illustrated in FIG. 2, one or more sensor modules SS1 and SS2 facing the second pixel area CA may be disposed in the lower portion of the display panel 100. For example, various sensors such as an imaging module including an image sensor, an infrared sensor module, and an illuminance sensor module may be disposed in the lower portion of the first pixel area DA of the display panel 100. The second pixel area CA may include a light transmitting portion to increase the transmittance of light directed to the sensor module.

Since the first pixel area DA and the second pixel area CA include pixels, the input image may be displayed in the first pixel area DA and the second pixel area CA.

Each of the pixels in the first pixel area DA and the second pixel area CA includes sub-pixels having different colors to reproduce colors in an image. The sub-pixels include a red sub-pixel (hereinafter referred to as "R sub-pixel"), a green sub-pixel (hereinafter referred to as "G sub-pixel"), and a blue sub-pixel (hereinafter referred to as "B sub-pixel"). Although not shown, each of the pixels may further include a white sub-pixel (hereinafter referred to as "W sub-pixel"). Each of the sub-pixels may include a pixel circuit that drives a light emitting element.

An image quality compensation algorithm for compensating the luminance and color coordinates of pixels may be applied to the second pixel area CA having a PPI lower than that of the first pixel area DA.

In the display device of the present disclosure, since pixels are arranged in the second pixel area CA where the sensor is disposed, the display area of the screen is not limited due to an imaging module such as a camera. Accordingly, the display device of the present disclosure may implement a full-screen display.

The display panel 100 has a width in an X-axis direction, a length in a Y-axis direction, and a thickness in a Z-axis direction. The display panel 100 may include a circuit layer 12 disposed on a substrate 10 and a light emitting element layer 14 disposed on the circuit layer 12. A polarizing plate 18 may be disposed on the light emitting element layer 14, and a cover glass 20 may be disposed on the polarizing plate 18.

The circuit layer 12 may include a pixel circuit connected to wires such as data lines, gate lines, and power lines, and a gate driver connected to the gate lines. The circuit layer 12 may include transistors implemented as thin film transistors (TFT) and circuit elements such as capacitors. The wires and circuit elements of the circuit layer 12 may be implemented with a plurality of insulating layers, two or more metal layers separated with an insulating layer therebetween, and an active layer including a semiconductor material.

The light emitting element layer 14 may include a light emitting element driven by the pixel circuit. The light emitting element may be implemented with an OLED. The OLED includes an organic compound layer formed between an anode and a cathode. The organic compound layer may include a hole injection layer HIL, a hole transport layer HTL, an emission layer EML, an electron transport layer ETL, and an electron injection layer EIL, but is not limited thereto. When a voltage is applied to the anode and cathode of the OLED, holes that have passed through the hole transport layer HTL and electrons that have passed through the electron transport layer ETL move to the emission layer EML to form excitons, and as a result, visible light is emitted from the emission layer EML. The light emitting element layer 14 may be disposed on pixels that selectively transmit red, green, and blue wavelengths and may further include a color filter array.

The light emitting element layer 14 may be covered with a passivation layer, and the passivation layer may be covered with an encapsulation layer. The passivation layer and the encapsulation layer may have a structure in which an organic film and an inorganic film are alternately stacked. The inorganic film blocks or at least reduces the penetration of moisture or oxygen. The organic film flattens the surface of the inorganic film. When the organic film and the inorganic film are stacked in multiple layers, the movement path of moisture or oxygen becomes longer than that in a single layer, so that the penetration of moisture/oxygen affecting the light emitting element layer 14 may be effectively blocked or at least reduced.

The polarizing plate 18 may be adhered to the encapsulation layer. The polarizing plate 18 improves outdoor visibility of the display device. The polarizing plate 18 reduces light reflected from the surface of the display panel 100 and blocks light reflected from the metal of the circuit layer 12 to improve brightness of the pixels. The polarizing plate 18 may be implemented as a polarizing plate in which a linear polarizing plate and a phase delay film are bonded, or a circular polarizing plate.

Figure 3:
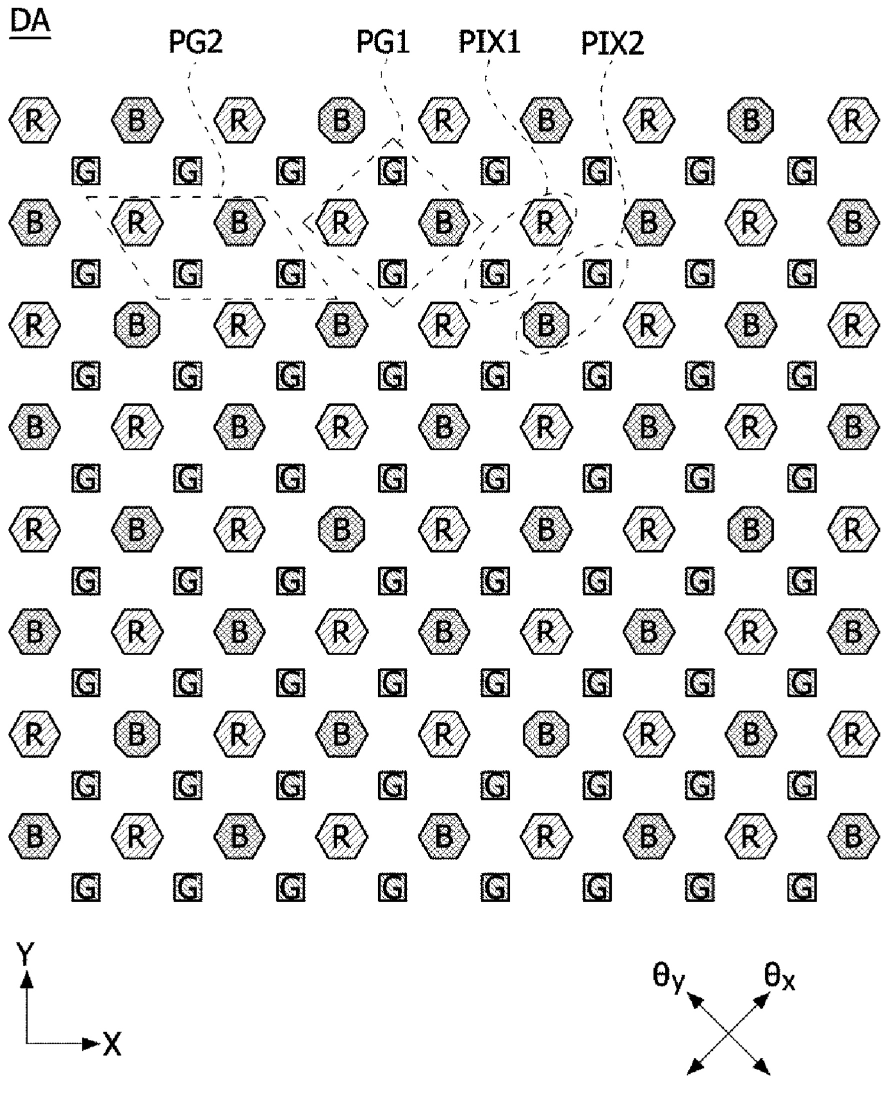
FIG. 3 is a diagram showing an arrangement of pixels in a first pixel area according to an embodiment of the present disclosure.
Figure 4:
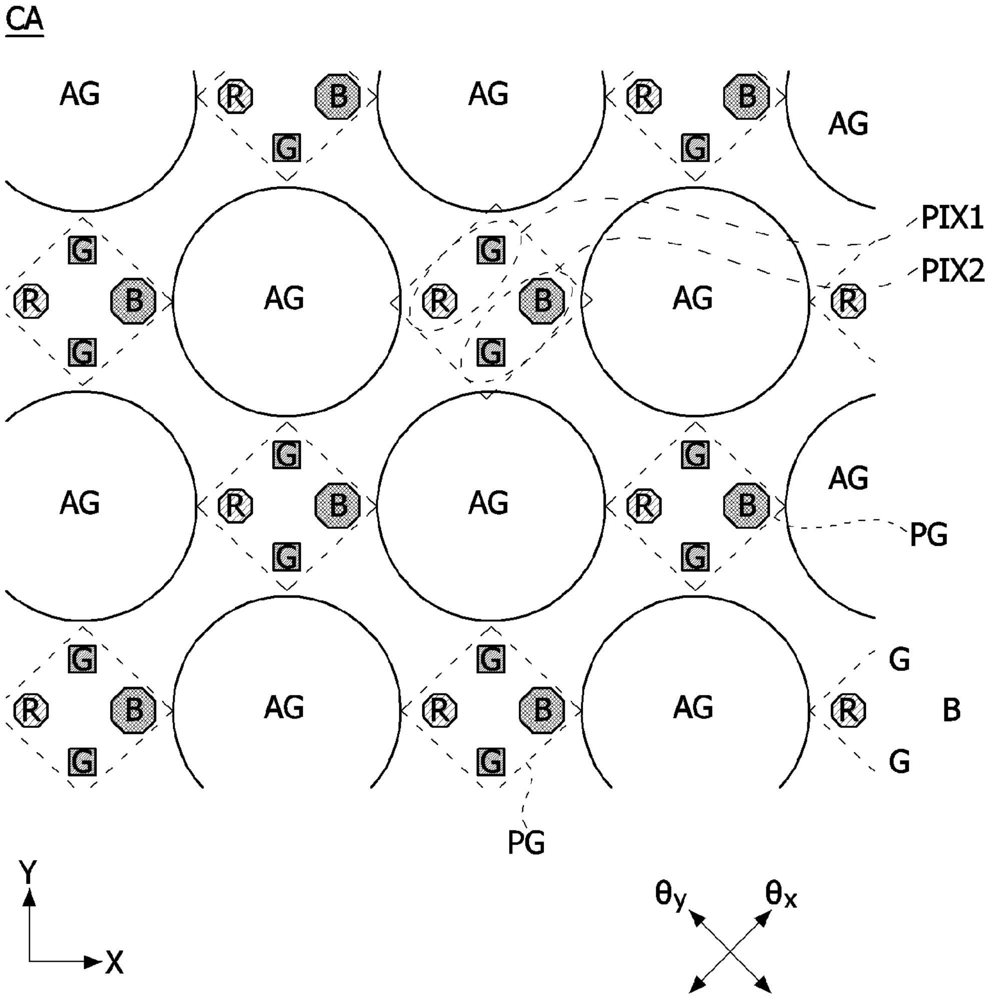
FIG. 4 is a diagram showing an arrangement of pixels in a second pixel area according to an embodiment of the present disclosure.

FIG. 3 is a diagram illustrating an example of pixel arrangement in the first pixel area DA according to one embodiment. FIG. 4 is a diagram illustrating an example of a light transmitting portion and pixels in the second pixel area CA according to one embodiment. In FIGS. 3 and 4, wires connected to the pixels are omitted.

Referring to FIG. 3, the first pixel area DA includes pixels PIX1 and PIX2 arranged with high PPI. Each of the pixels PIX1 and PIX2 may be implemented as a real type pixel in which R, G, and B sub-pixels of three primary colors constitute one pixel. Each of the pixels PIX1 and PIX2 may further include a W sub-pixel omitted from the drawing.

Each of the pixels may be composed of two sub-pixels using a sub-pixel rendering algorithm. For example, a first pixel PIX1 may be composed of an R sub-pixel and a first G sub-pixel, and a second pixel PIX2 may be composed of a B sub-pixel and a second G sub-pixel. Insufficient color representation in each of the first and second pixels PIX1 and PIX2 may be compensated by an average value of corresponding color data between neighboring pixels.

The pixels in the first pixel area DA may be defined as unit pixel groups PG1 and PG2 having a predetermined size. The unit pixel groups PG1 and PG2 are pixel areas of the predetermined size including four sub-pixels. The unit pixel groups PG1 and PG2 are repeatedly arranged in a first direction (X-axis), in a second direction (Y-axis) perpendicular to the first direction, and in an inclined direction (θx and θy axes) between the first and second directions. θx and θy denote the directions of the inclined axes formed by rotating the X-axis and Y-axis by 45°, respectively.

The unit pixel groups PG1 and PG2 may be a parallelogram-shaped pixel area PG1 or a rhombus-shaped pixel area PG2. The unit pixel groups PG1 and PG2 should be interpreted as including a rectangular shape, a square shape, and the like.

The sub-pixels of the unit pixel groups PG1 and PG2 include a sub-pixel of a first color, a sub-pixel of a second color, and a sub-pixel of a third color, in which two sub-pixels of any one of the first to third color sub-pixels are included. For example, the unit pixel groups PG1 and PG2 may include one R sub-pixel, two G sub-pixels, and one B sub-pixel. In the sub-pixels in the unit pixel groups PG1 and PG2, the luminous efficiency of the light emitting element may be different for each color. In consideration of this, the size of the sub-pixels may vary for each color. For example, among the R, G, and B sub-pixels, the B sub-pixel may be the largest and the G sub-pixel may be the smallest.

Referring to FIG. 4, the second pixel area CA includes pixel groups PG spaced apart by a predetermined distance and light transmitting portions AG disposed between the neighboring pixel groups PG. External light is received by the lens of the sensor module through the light transmitting portions AG. The light transmitting portions AG may include transparent media having high transmittance without metal so that light may be incident with minimal light loss. In other words, the light transmitting portions AG may be formed of transparent insulating materials without including metal wires or pixels. The PPI of the second pixel area CA is lower than that of the first pixel area DA due to the light transmitting portions AG.

The pixel group PG of the second pixel area CA may include one or two pixels. Each pixel of the pixel group may include two to four sub-pixels. For example, one pixel in the pixel group may include R, G, and B sub-pixels or may include two sub-pixels, and further a W sub-pixel. In the example of FIG. 4, a first pixel PIX1 is composed of R and G sub-pixels, and a second pixel PIX2 is composed of B and G sub-pixels, but the present disclosure is not limited thereto.

The shape of the light transmitting portions AG is illustrated to be circular in FIG. 4, but is not limited thereto. For example, the light transmitting portions AG may be designed in various shapes such as a circle, an ellipse, and a polygon.

Due to process deviation and element properties deviation caused in the manufacturing process of the display panel, there may be a difference in the electrical properties of a driving element between pixels, and this difference may be increased as the driving time of the pixels elapses. In order to compensate for deviation in the electrical properties of the driving element between pixels, an internal compensation technique or an external compensation technique may be applied to an organic light emitting display device.

The internal compensation technique senses a threshold voltage of the driving element for each sub-pixel by using an internal compensation circuit implemented in each pixel circuit, and compensates a gate-source voltage Vgs of the driving element by the threshold voltage. The external compensation technique senses in real time a current or voltage of the driving element that varies depending on the electrical properties of the driving elements, by using an external compensation circuit. The external compensation technique modulates pixel data (digital data) of an input image as much as the deviation in the electrical properties (or variation) of the driving element sensed for each pixel, thereby compensating the electrical properties deviation (or variation) of the driving element in each of the pixels in real time.

Figure 5:
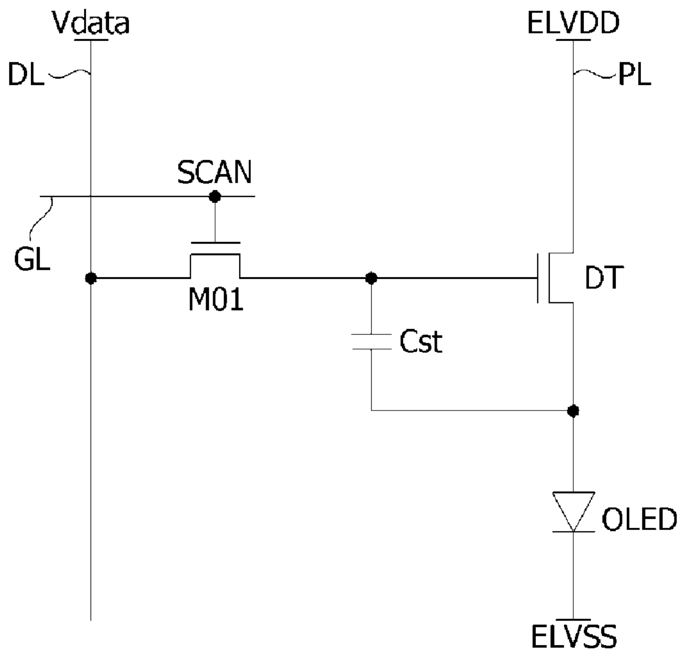
FIGS. 5 to 7 are circuit diagrams showing various pixel circuits applicable to the present disclosure.
Figure 6:
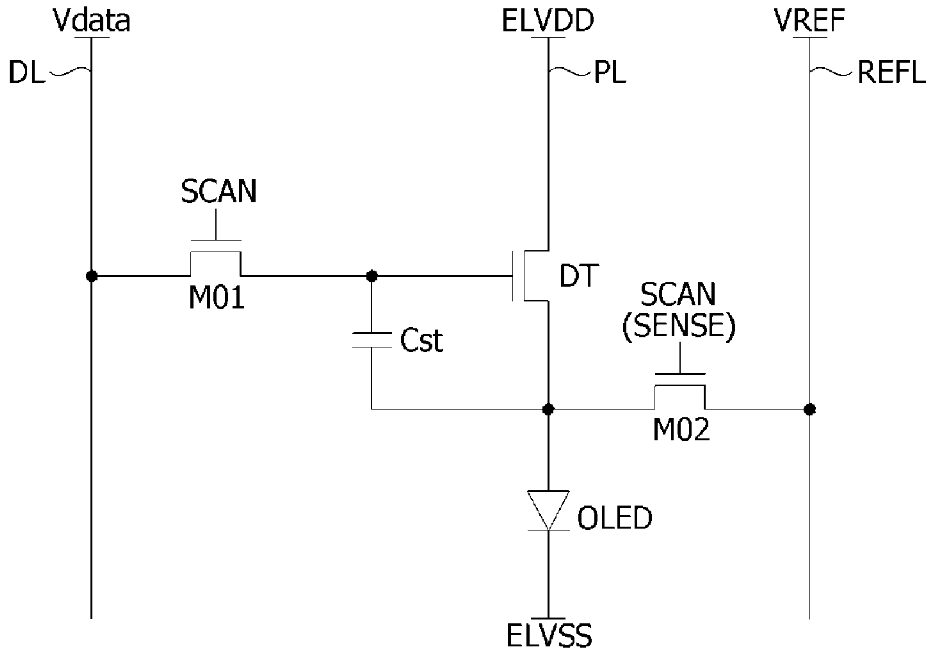
Figure 7:
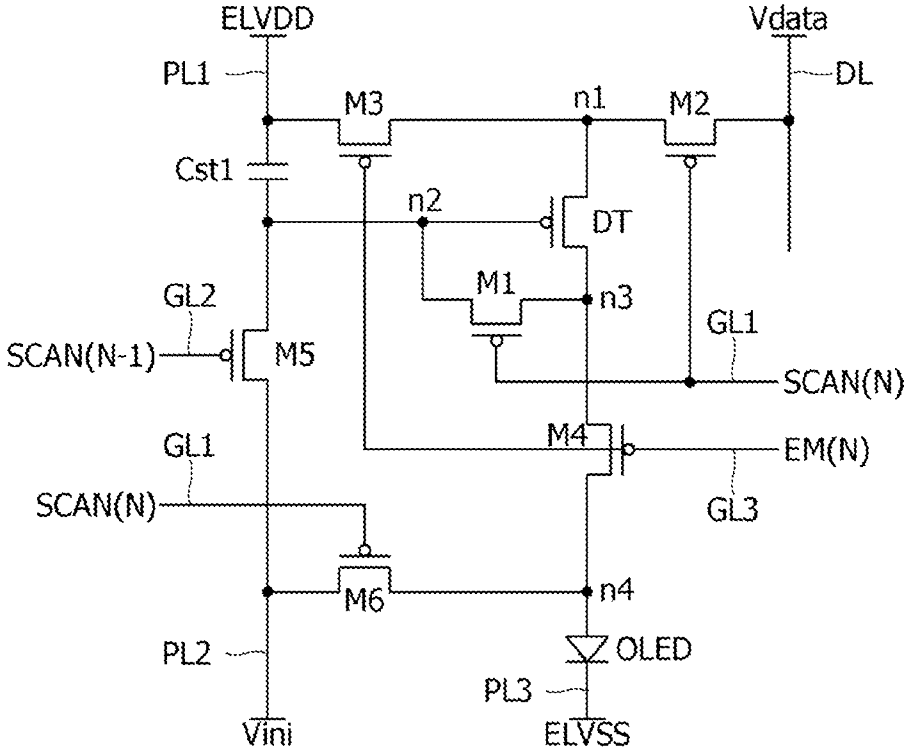

FIGS. 5 to 7 are circuit diagrams showing various examples of pixel circuits applicable to the present disclosure.

Referring to FIG. 5, the pixel circuit includes a light emitting element OLED, a driving element DT for supplying a current to the light emitting element OLED, a switch element M01 for connecting a data line DL in response to a scan pulse SCAN, and a capacitor Cst connected to the gate of the driving element DT. The driving element DT and the switch element M01 may be implemented with n-channel transistors.

A pixel driving voltage ELVDD is applied to the first electrode of the driving element DT through a power line PL. The driving element DT drives the light emitting element OLED by supplying a current to the light emitting element OLED according to the gate-source voltage Vgs. The light emitting element OLED is turned on and emits light when a forward voltage between the anode electrode and the cathode electrode is greater than or equal to the threshold voltage. The capacitor Cst is connected between the gate electrode and the source electrode of the driving element DT to maintain the gate-source voltage Vgs of the driving element DT.

FIG. 6 is an example of a pixel circuit connected to an external compensation circuit.

Referring to FIG. 6, the pixel circuit further includes a second switch element M02 connected between a reference voltage line REFL and the second electrode (or source) of the driving element DT. In this pixel circuit, the driving element DT and the switch elements M01 and M02 may be implemented as n-channel transistors.

The second switch element M02 applies a reference voltage Vref in response to the scan pulse SCAN or a separate sensing pulse SENSE. The reference voltage VREF is applied to the pixel circuit through the reference voltage line REFL.

In a sensing mode, a current flowing through a channel of the driving element DT or a voltage between the driving element DT and the light emitting element OLED is sensed through the reference line REFL. A current flowing through the reference line REFL is converted into a voltage through an integrator and converted into digital data through an analog-to-digital converter (ADC). This digital data is sensing data including information on a threshold voltage or mobility of the driving element DT. The sensing data is transmitted to a data operation unit. The data operation unit may receive the sensing data from the ADC and add or multiply a compensation value selected based on the sensing data to or by the pixel data, thereby compensating for driving deviation and deterioration of pixels.

Figure 8:
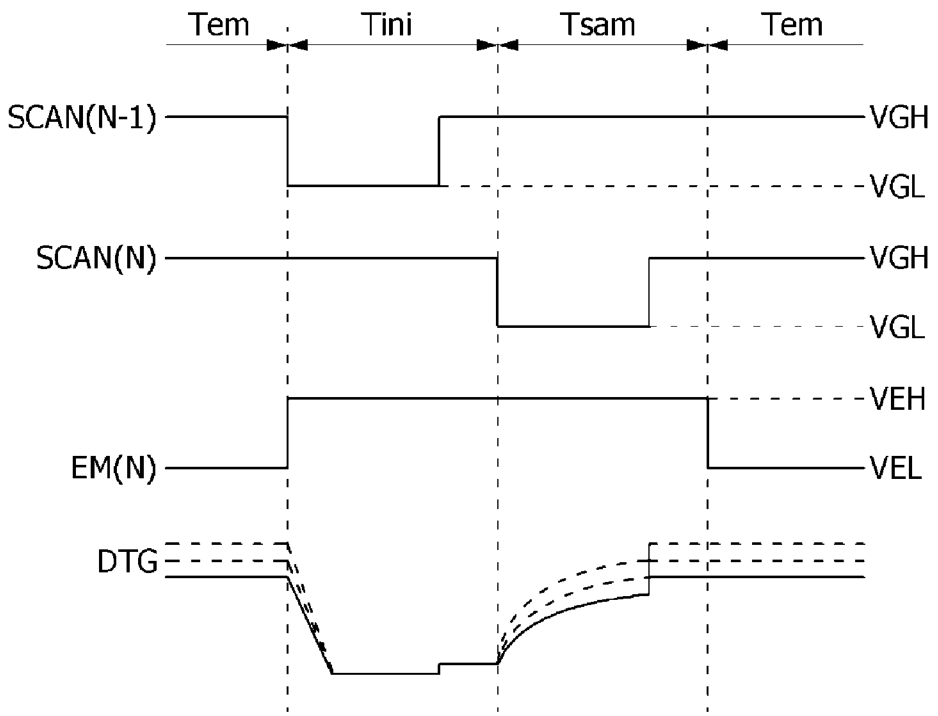
FIG. 8 is a waveform diagram showing a method of driving the pixel circuit shown in FIG. 7 according to an embodiment of the present disclosure.

FIG. 7 is a circuit diagram showing an example of a pixel circuit to which an internal compensation circuit is applied. FIG. 8 is a waveform diagram showing a method of driving the pixel circuit shown in FIG. 7.

Referring to FIGS. 7 and 8, the pixel circuit includes the light emitting element OLED, the driving element DT for supplying a current to the light emitting element OLED, and a switch circuit for switching voltages applied to the light emitting element OLED and the driving element DT.

The switch circuit is connected to power lines PL1, PL2, and PL3 to which the pixel driving voltage ELVDD, a low potential power voltage ELVSS, and an initialization voltage Vini are applied, the data line DL, and gate lines GL1, GL2, and GL3, and switches the voltages applied to the light emitting element OLED and the driving element DT in response to scan pulses SCAN(N−1) and SCAN(N) and an emission switching pulse EM(N).

The switch circuit includes the internal compensation circuit that samples, using a plurality of switch elements M1 to M6, a threshold voltage Vth of the driving element DT to store it in a capacitor Cst1 and compensates the gate voltage of the driving element DT by the threshold voltage Vth of the driving element DT. Each of the driving element DT and the switch elements M1 to M6 may be implemented with a p-channel TFT.

The driving period of the pixel circuit may be divided, as shown in FIG. 8, into an initialization period Tini, a sampling period Tsam, and a light emission period Tem.

An $N^{th}$ scan pulse SCAN(N) is generated as the gate-on voltage VGL during the sampling period Tsam and is applied to a first gate line GL1. An $(N-1)^{th}$ scan pulse SCAN(N−1) is generated as the gate-on voltage VGL during the initialization period Tini prior to the sampling period and is applied to a second gate line GL2. The emission switching pulse EM(N) is generated as the gate-off voltage VGH during the initialization period Tini and the sampling period Tsam, and is applied to a third gate line GL3.

During the initialization period Tini, the $(N-1)^{th}$ scan pulse SCAN(N−1) is generated as the gate-on voltage VGL, and the voltage of each of the $N^{th}$ scan pulse SCAN(N) and the emission switching pulse EM(N) is the gate-off voltage VGH. During the sampling period Tsam, the $N^{th}$ scan pulse SCAN(N) is generated as the pulse of the gate-on voltage VGL, and the voltage of each of the $(N-1)^{th}$ scan pulse SCAN(N−1) and the emission switching pulse EM(N) is the gate-off voltage VGH. During at least a part of the light emission period Tem, the emission switching pulse EM(N) is generated as the gate-on voltage VGL, and the voltage of each of the $(N-1)^{th}$ scan pulse SCAN(N−1) and the $N^{th}$ scan pulse SCAN(N) is the gate-off voltage VGH.

During the initialization period Tini, a fifth switch element M5 is turned on in response to the gate-on voltage VGL of the $(N-1)^{th}$ scan pulse SCAN(N−1) to initialize the pixel circuit. During the sampling period Tsam, first and second switch elements M1 and M2 are turned on in response to the gate-on voltage VGL of the $N^{th}$ scan pulse SCAN(N), so that a data voltage Vdata compensated by the threshold voltage of the driving element DT is stored in the capacitor Cst1. At the same time, a sixth switch element M6 is turned on during the sampling period Tsam to lower the voltage of a fourth node n4 to a reference voltage Vref, thereby suppressing light emission of the light emitting element OLED.

During the light emission period Tem, third and fourth switch elements M3 and M4 are turned on, so that the light emitting element OLED emits light. During the light emission period Tem, in order to accurately express the luminance of low grayscale, the voltage level of the emission switching pulse EM(N) may be inverted at a predetermined duty ratio between the gate-on voltage VGL and the gate-off voltage VGH. In this case, the third and fourth switch elements M3 and M4 may repeatedly turn on/off at the duty ratio of the emission switching pulse EM(N) during the light emission period Tem.

The anode electrode of the light emitting element OLED is connected to the fourth node n4 between the fourth and sixth switch elements M4 and M6. The fourth node n4 is connected to the anode of the light emitting element OLED, the second electrode of the fourth switch element M4, and the second electrode of the sixth switch element M6. The cathode electrode of the light emitting element OLED is connected to the VSS line PL3 to which the low potential power voltage ELVSS is applied. The light emitting element OLED emits light by a current Ids flowing according to the gate-source voltage Vgs of the driving element DT. The current path of the light emitting element OLED is switched by the third and fourth switch elements M3 and M4.

The capacitor Cst1 is connected between a VDD line PL1 and a second node n2. The data voltage Vdata compensated by the threshold voltage Vth of the driving element DT is charged in the capacitor Cst1. Since the data voltage Vdata is compensated by the threshold voltage Vth of the driving element DT in each of the sub-pixels, deviation in the electrical properties of the driving element DT is compensated in the sub-pixels.

The first switch element M1 is turned on in response to the gate-on voltage VGL of the $N^{th}$ scan pulse SCAN(N) to connect the second node n2 to a third node n3. The second node n2 is connected to the gate electrode of the driving element DT, the first electrode of the capacitor Cst1, and the first electrode of the first switch element M1. The third node n3 is connected to the second electrode of the driving element DT, the second electrode of the first switch element M1, and the first electrode of the fourth switch element M4. The gate electrode of the first switch element M1 is connected to the first gate line GL1 to receive the $N^{th}$ scan pulse SCAN(N). The first electrode of the first switch element M1 is connected to the second node n2, and the second electrode of the first switch element M1 is connected to the third node n3.

Since the first switch element M1 is turned on only for one horizontal period 1H, which is very short, in which the $N^{th}$ scan pulse SCAN(N) is generated as the gate-on voltage VGL in one frame period, a leakage current may occur in the off state. In order to suppress the leakage current in the first switch element M1, the first switch element M1 may be implemented with a transistor having a dual gate structure in which two transistors are connected in series.

The second switch element M2 is turned on in response to the gate-on voltage VGL of the $N^{th}$ scan pulse SCAN(N) to supply the data voltage Vdata to a first node n1. The gate electrode of the second switch element M2 is connected to the first gate line GL1 to receive the $N^{th}$ scan pulse SCAN (N). The first electrode of the second switch element M2 is connected to the first node n1. The second electrode of the second switch element M2 is connected to the data line DL to which the data voltage Vdata is applied. The first node n1 is connected to the first electrode of the second switch element M2, the second electrode of the third switch element M3, and the first electrode of the driving element DT.

The third switch element M3 is turned on in response to the gate-on voltage VGL of the emission switching pulse EM(N) to connect the VDD line PL1 to the first node n1. The gate electrode of the third switch element M3 is connected to the third gate line GL3 to receive the emission switching pulse EM(N). The first electrode of the third switch element M3 is connected to the VDD line PL1. The second electrode of the third switch element M3 is connected to the first node n1.

The fourth switch element M4 is turned on in response to the gate-on voltage VGL of the emission switching pulse EM(N) to connect the third node n3 to the anode electrode of the light emitting element OLED. The gate electrode of the fourth switch element M4 is connected to the third gate line GL3 to receive the emission switching pulse EM(N). The first electrode of the fourth switch element M4 is connected to the third node n3, and the second electrode thereof is connected to the fourth node n4.

The fifth switch element M5 is turned on in response to the gate-on voltage VGL of the $(N-1)^{th}$ scan pulse SCAN (N−1) to connect the second node n2 to the Vini line PL2. The gate electrode of the fifth switch element M5 is connected to the second gate line GL2 to receive the $(N-1)^{th}$ scan pulse SCAN(N−1). The first electrode of the fifth switch element M5 is connected to the second node n2, and the second electrode thereof is connected to the Vini line PL2. In order to suppress a leakage current in the fifth switch element M5, the fifth switch element M5 is implemented with a transistor having a dual gate structure in which two transistors are connected in series.

The sixth switch element M6 is turned on in response to the gate-on voltage VGL of the $N^{th}$ scan pulse SCAN(N) to connect the Vini line PL2 to the fourth node n4. The gate electrode of the sixth switch element M6 is connected to the first gate line GL1 to receive the $N^{th}$ scan pulse SCAN(N). The first electrode of the sixth switch element M6 is connected to the Vini line PL2, and the second electrode thereof is connected to the fourth node n4.

In another embodiment, the gate electrodes of the fifth and sixth switch elements M5 and M6 may be commonly connected to the second gate line GL2 to which the $(N-1)^{th}$ scan pulse SCAN(N−1) is applied. In this case, the fifth and sixth switch elements M5 and M6 may be simultaneously turned on in response to the $(N-1)^{th}$ scan pulse SCAN(N−1).

The driving element DT drives the light emitting element OLED by controlling a current flowing through the light emitting element OLED according to the gate-source voltage Vgs. The driving element DT includes a gate connected to the second node n2, a first electrode connected to the first node n1, and a second electrode connected to the third node n3.

During the initialization period Tini, the $(N-1)^{th}$ scan pulse SCAN(N−1) is generated as the gate-on voltage VGL. The $N^{th}$ scan pulse SCAN(N) and the emission switching pulse EM(N) maintain the gate-off voltage VGH during the initialization period Tini. Accordingly, during the initialization period Tini, the fifth switch element M5 is turned on, so that the second and fourth nodes n2 and n4 are initialized to Vini. A hold period may be set between the initialization period Tini and the sampling period Tsam. During the hold period, the scan pulses SCAN(N−1) and SCAN(N) and the emission switching pulse EM(N) are the gate-off voltage.

During the sampling period Tsam, the $N^{th}$ scan pulse SCAN(N) is generated as the gate-on voltage VGL. The pulse of the $N^{th}$ scan pulse SCAN(N) is synchronized with the data voltage Vdata of a $N^{th}$ pixel line. The $(N-1)^{th}$ scan pulse SCAN(N−1) and the emission switching pulse EM(N) maintain the gate-off voltage VGH during the sampling period Tsam. Accordingly, the first and second switch elements M1 and M2 are turned on during the sampling period Tsam.

During the sampling period Tsam, a gate voltage DTG of the driving element DT rises due to a current flowing through the first and second switch elements M1 and M2. When the driving element DT is turned off, the gate voltage DTG is $Vdata-|Vth|$. In this case, the voltage of the first node n1 is also $Vdata-|Vth|$. During the sampling period Tsam, the gate-source voltage Vgs of the driving element DT is expressed as $|Vgs|=Vdata-(Vdata-|Vth|)=|Vth|$.

During the light emission period Tem, the emission switching pulse EM(N) may be generated as the gate-on voltage VGL. During the light emission period Tem, the voltage of the emission switching pulse EM(N) may be inverted at a predetermined duty ratio. Accordingly, the emission switching pulse EM(N) may be generated as the gate-on voltage VGL during at least a part of the light emission period Tem.

When the emission switching pulse EM(N) is the gate-on voltage VGL, a current flows between ELVDD and the light emitting element OLED, so that the light emitting element OLED may emit light. During the light emission period Tem, the $(N-1)^{th}$ and $N^{th}$ scan pulses SCAN(N−1) and SCAN(N) maintain the gate-off voltage VGH. During the light emission period Tem, the third and fourth switch elements M3 and M4 are turned on according to the gate-on voltage of the emission switching pulse EM(N). When the emission switching pulse EM(N) is the gate-on voltage VGL, the third and fourth switch elements M3 and M4 are turned on, so that a current flows through the light emitting element OLED. At this time, Vgs of the driving element DT is expressed as |Vgs|=VDD−(Vdata−|Vth|), and the current flowing through the light emitting element OLED is $K(VDD-Vdata)^2$. K is a constant value determined by charge mobility, parasitic capacitance, channel capacity, and the like of the driving element DT.

Figure 9:
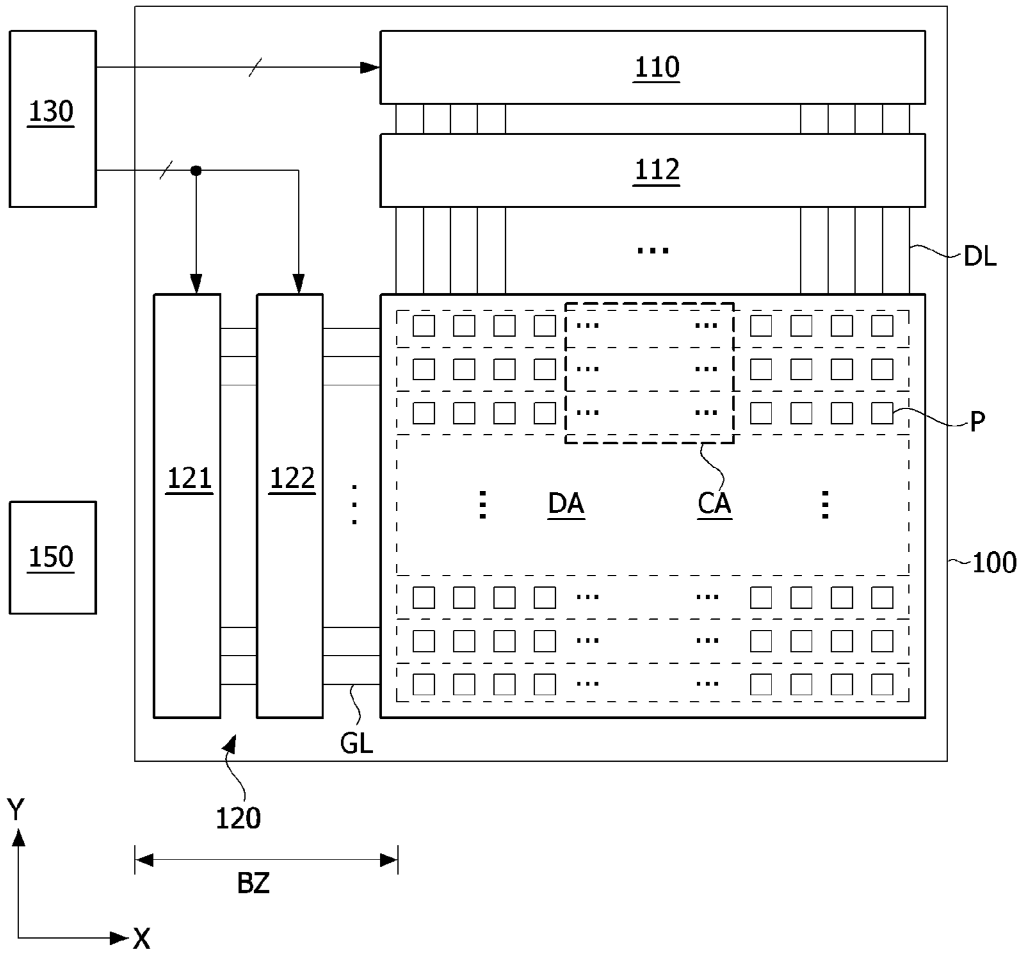
FIG. 9 is a block diagram showing a display device according to an embodiment of the present disclosure.

FIG. 9 is a block diagram showing a display device according to an embodiment of the present disclosure.

Referring to FIG. 9, the display device according to an embodiment of the present disclosure includes the display panel 100 and a display panel driver 110 and 120 for writing the pixel data of the input image to pixels P of the display panel 100, a timing controller 130 for controlling the display panel driver, and a power supply unit 150 for generating power required for driving the display panel 100.

The display panel 100 includes a pixel array that displays an input image on a screen. As described above, the pixel array may be divided into the first pixel area DA, and the second pixel area CA having a resolution or PPI lower than that of the first pixel area DA. Since the first pixel area DA includes the pixels P of high resolution and high PPI and thus is larger in size than the second pixel area CA, most of the image information is displayed on the first pixel area DA. Each of the sub-pixels of the pixel array may drive the light emitting element OLED by using the pixel circuits as in FIGS. 5 to 7.

Touch sensors may be disposed on the screen of the display panel 100. The touch sensors may be disposed on the screen of the display panel in an on-cell type or an add-on type, or may be implemented as in-cell type touch sensors that are incorporated in the pixel array.

The display panel 100 may be implemented as a flexible display panel in which the pixels P are arranged on a flexible substrate such as a plastic substrate or a metal substrate. In a flexible display, the size and shape of the screen may be changed by winding, folding, or bending the flexible display panel. The flexible display may include a slideable display, a rollable display, a bendable display, a foldable display, and the like.

The display panel driver may drive the pixels P by applying the internal compensation technique and/or the external compensation technique.

The display panel driver reproduces the input image on the screen of the display panel 100 by writing the pixel data of the input image to the sub-pixels. The display panel driver includes the data driver 110 and the gate driver 120. The display panel driver may further include a demultiplexer 112 disposed between the data driver 110 and the data lines DL.

The display panel driver may operate in a low speed driving mode under the control of the timing controller 130. In the low speed driving mode, the input image is analyzed and when the input image does not change for a preset period of time, power consumption of the display device may be reduced. In the low speed driving mode, when a still image is inputted for a certain period of time or over, a refresh rate of the pixels P is lowered to control the data writing period of the pixels P to be longer, thereby reducing the power consumption. The low speed driving mode is not limited to when a still image is inputted. For example, when the display device operates in a standby mode or when a user command or an input image is not inputted to a display panel driving circuit for a predetermined period of time or over, the display panel driving circuit may operate in the low speed driving mode.

The data driver 110 converts the pixel data, which is digital data, of the input image into a gamma compensation voltage using a digital to analog converter (hereinafter referred to as "DAC") to generate the data voltage Vdata. The data driver 110 may include a voltage divider circuit that outputs the gamma compensation voltage. The voltage divider circuit divides a gamma reference voltage from the power supply unit 150 to generate the gamma compensation voltage for each grayscale, and provides it to the DAC. The DAC may convert the pixel data or compensation data into the gamma compensation voltage and output the data voltage and a compensation voltage. The data voltage outputted from the channels of the data driver 110 may be supplied to the data lines DL of the display panel 100 through the demultiplexer 112.

The demultiplexer 112 time-divisionally distributes the data voltage Vdata outputted through the channels of the data driver 110 to the plurality of data lines DL. The number of channels of the data driver 110 may be reduced due to the demultiplexer 112. The demultiplexer 112 may be omitted. In this case, the channels of the data driver 110 are directly connected to the data lines DL.

The gate driver 120 may be implemented in a gate in panel (GIP) circuit formed directly on a bezel region BZ of the display panel 100 together with a TFT array of the pixel array. The gate driver 120 outputs a gate signal to the gate lines GL under the control of the timing controller 130. The gate driver 120 may shift the gate signal using a shift register to sequentially supply the signal to the gate lines GL. The voltage of the gate signal swings between the gate-off voltage VGH and the gate-on voltage VGL. The gate signal may include the scan pulse, the Emission switching pulse, the sensing pulse, which are shown in FIGS. 5 to 7, and the like.

The gate driver 120 may be disposed on each of left and right bezels of the display panel 100 to supply the gate signal to the gate lines GL in a double feeding method. In the double feeding method, the gate drivers 120 on both sides are synchronized, so that the gate signal may be simultaneously applied to both ends of one gate line. In another embodiment, the gate driver 120 may be disposed on one of the left and right bezels of the display panel 100 to supply the gate signal to the gate lines GL in a single feeding method.

The gate driver 120 may include a first gate driver 121 and a second gate driver 122. The first gate driver 121 outputs the scan pulse and the sensing pulse, and shifts the scan pulse and the sensing pulse according to a shift clock. The second gate driver 122 outputs the pulse of the EM signal and shifts the emission switching pulse according to a shift clock. In the case of a model having no bezel, at least some of the switch elements constituting the first and second gate drivers 121 and 122 may be distributedly disposed in the pixel array.

The timing controller 130 receives the pixel data of the input image and a timing signal synchronized with the pixel data from the host system. The timing signal includes a vertical synchronization signal Vsync, a horizontal synchronization signal Hsync, a clock CLK, a data enable signal DE, and the like. One period of the vertical synchronization signal Vsync is one frame period. One period of the horizontal synchronization signal Hsync and the data enable signal DE is one horizontal period 1H. The pulse of the data enable signal DE is synchronized with one line data to be written to the pixels P of one pixel line. Since the frame period and the horizontal period may be known by counting the data enable signal DE, the vertical synchronization signal Vsync and the horizontal synchronization signal Hsync may be omitted.

The timing controller 130 transmits the pixel data of the input image to the data driver 120 and synchronizes the data driver 110, the demultiplexer 112, and the gate driver 120. The timing controller 130 may include a data operation unit that receives sensing data obtained from the pixels P from the display panel driver to which the external compensation technique is applied and modulates the pixel data. In this case, the timing controller 130 transmits the pixel data modulated by the data operation unit to the data driver 110.

The timing controller 130 may multiply an input frame frequency by i (i being a positive integer greater than 0) to control the operation timing of the display panel driver 110, 112, and 120 at a frame frequency of the input frame frequency×i Hz. The input frame frequency is 60 Hz in a National Television Standards Committee (NTSC) system and 50 Hz in a Phase-Alternating Line (PAL) system. The timing controller 130 may lower the frame frequency to a frequency between 1 Hz and 30 Hz in order to lower the refresh rate of the pixels P in the low speed driving mode.

The timing controller 130 generates a data timing control signal for controlling the operation timing of the data driver 110, a switch control signal for controlling the operation timing of the demultiplexer 112, and a gate timing control signal for controlling the operation timing of the gate driver 120, based on the timing signals Vsync, Hsync, and DE received from the host system.

The gate timing control signal may include a start pulse, a shift clock, and the like. The voltage level of the gate timing control signal outputted from the timing controller 130 may be converted into the gate-off voltage VGH/VEH or the gate-on voltage VGL/VEL through a level shifter omitted from the drawing and may be supplied to the gate driver 120. The level shifter may convert a low level voltage of the gate timing control signal into the gate-on voltage VGL, and may convert a high level voltage of the gate timing control signal into the gate-off voltage VGH.

The power supply unit 150 may include a charge pump, a regulator, a buck converter, a boost converter, a programmable gamma IC (P-GMA IC), and the like. The power supply unit 150 generates power required for driving the display panel driver and the display panel 100 by adjusting a DC input voltage from the host system. The power supply unit 150 may output DC voltages such as the gamma reference voltage, the gate-off voltage VGH/VEH, the gate-on voltage VGL/VEL, the pixel driving voltage ELVDD, the low potential power voltage ELVSS, the initialization voltage Vini, and the reference voltage VREF. The programmable gamma IC may vary the gamma reference voltage depending on a register setting value. The gamma reference voltage is supplied to the data driver 110. The gate-off voltage VGH/VEH and the gate-on voltage VGL/VEL are supplied to the level shifter and the gate driver 120. The pixel driving voltage ELVDD, the low potential power voltage ELVSS, the initialization voltage Vini, and the reference voltage VREF are commonly supplied to the pixel circuits through the power lines. The pixel driving voltage ELVDD is set to a voltage higher than the low potential power voltage ELVSS, the initialization voltage Vini, and the reference voltage VREF.

Figure 10:
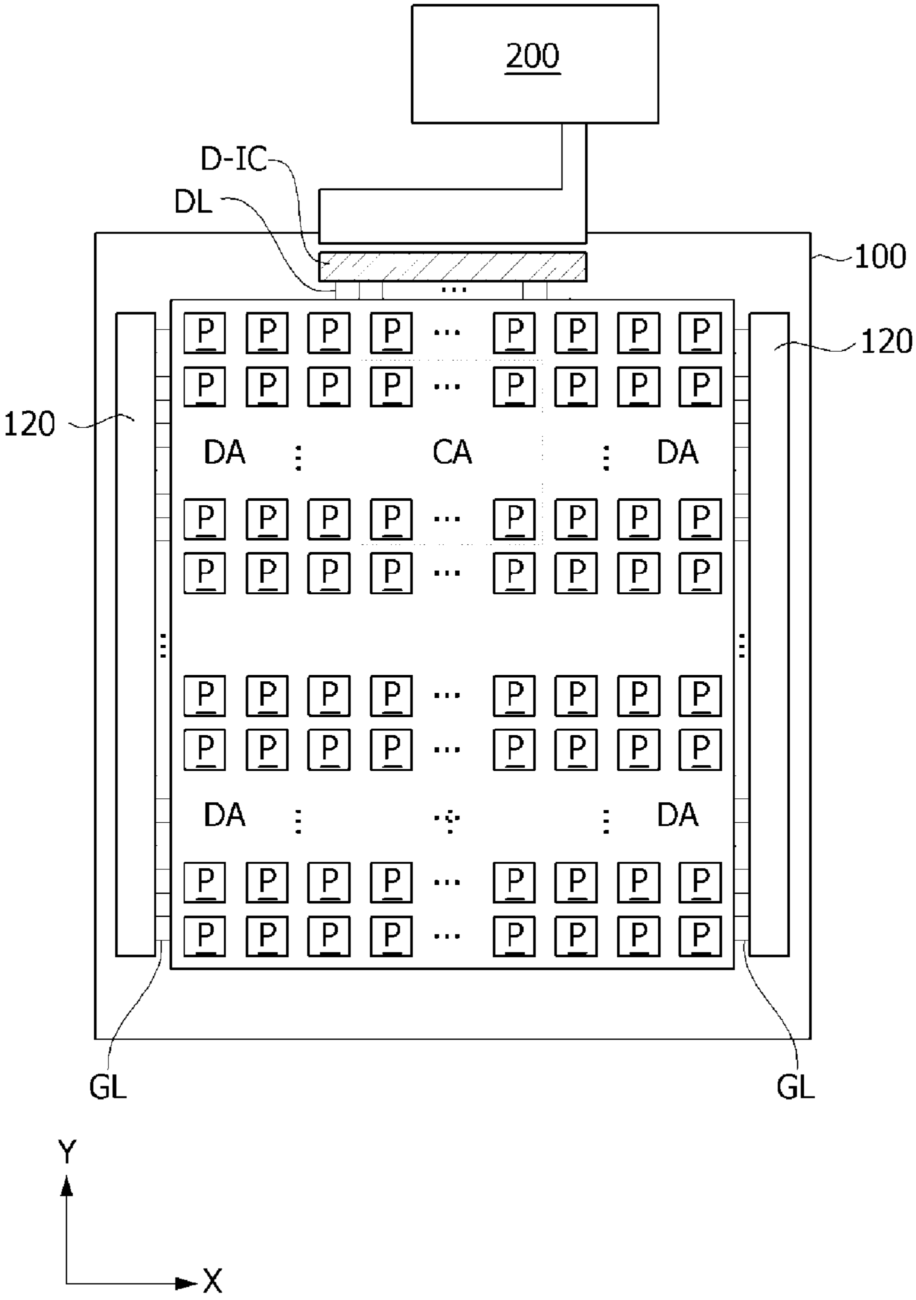
FIG. 10 is a diagram showing an example in which a display device according to an embodiment of the present disclosure is applied to a mobile device.

The host system may be a main circuit board of a television (TV) system, a set-top box, a navigation system, a personal computer (PC), a vehicle system, a home theater system, a mobile device, or a wearable device. In the mobile device or the wearable device, the timing controller 130, the data driver 110, and the power supply unit 150 may be integrated into one drive integrated circuit (D-IC) as shown in FIG. 10. In FIG. 10, reference numeral "200" denotes the host system.

Figure 11:
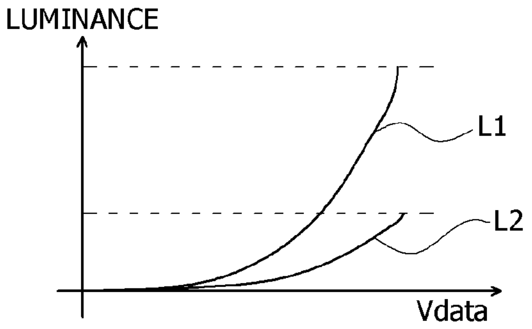
FIG. 11 is a diagram showing luminance difference between first and second pixel areas when data voltage ranges applied to pixels in the first and second pixel areas of a screen are the same according to an embodiment of the present disclosure.
Figure 11:
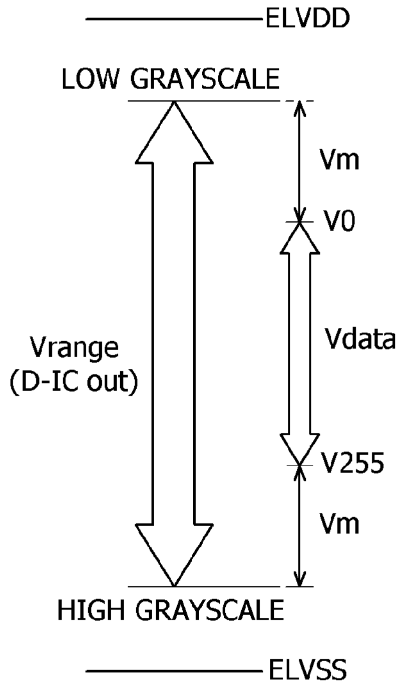
Figure 12:
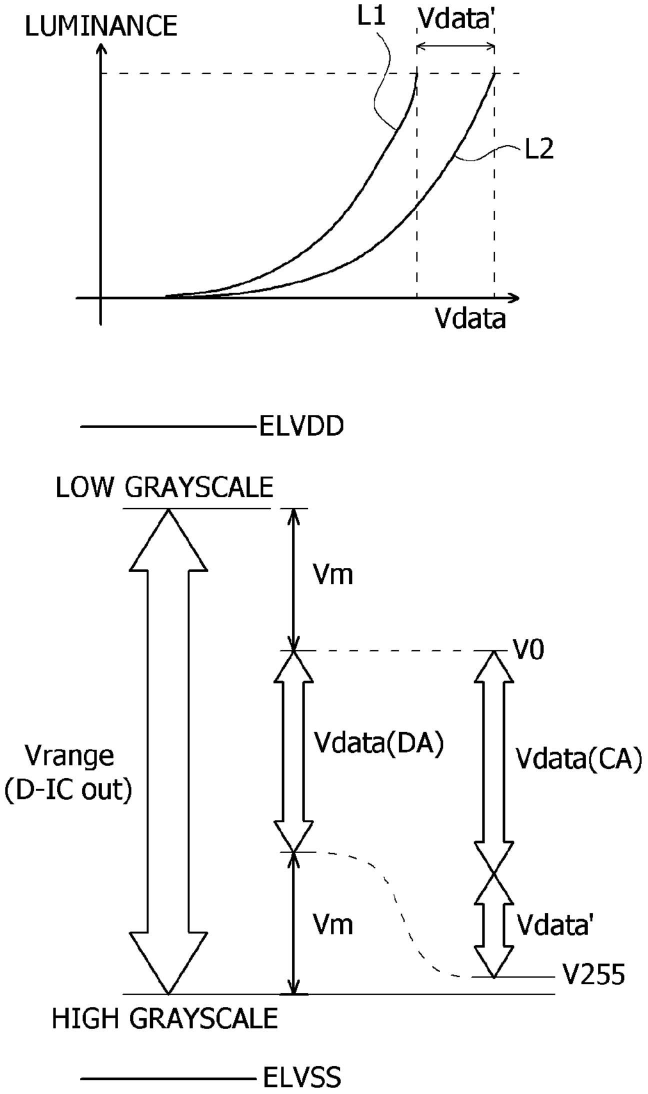
FIG. 12 is a diagram showing an example in which luminance difference between first and second pixel areas is reduced by extending a data voltage range applied to pixels in the second pixel area of a screen according to an embodiment of the present disclosure.

As shown in FIGS. 11 and 12, the data voltage Vdata outputted from the data driver 110 is determined as the gamma compensation voltage corresponding to the grayscale of the pixel data within a data voltage range between the minimum grayscale voltage $V_0$ and the maximum grayscale voltage $V_{255}$. The minimum grayscale voltage $V_0$ is a black grayscale voltage corresponding to a grayscale value zero, and the maximum grayscale voltage $V_{255}$ is a white grayscale voltage corresponding to a grayscale value 255. The data driver 110 has an output voltage range larger than the data voltage range. Accordingly, the data driver 110 may adjust the data voltage Vdata within a voltage margin Vm for optical compensation or in order to compensate for deterioration of the driving element DT or the light emitting element OLED. In the data voltage applied to the gate electrode of the driving element DT implemented as a p-channel transistor, as shown in FIGS. 11 and 12, a high grayscale voltage is set to a voltage lower than a low grayscale voltage. In the data voltage applied to the gate electrode of the driving element DT implemented as an n-channel transistor, the high grayscale voltage is set to a voltage higher than the low grayscale voltage.

The PPI of the second pixel area CA is less than that of the first pixel area DA. For this reason, if the data voltage Vdata applied to the pixels P of the second pixel area CA is equal to the data voltage Vdata applied to the pixels P of the first pixel area DA at the same grayscale, as shown in FIG. 11, a luminance L2 of the second pixel area CA may be less than a luminance L1 of the first pixel area DA. Accordingly, a difference in luminance between the first pixel area DA and the second pixel area CA may be caused, so that the difference in luminance may be visually recognized for each area on the screen of the display device.

In FIG. 12, "Vrange (D-IC Out)" is an output voltage range between the minimum voltage and the maximum voltage outputted from the data driver 110. The voltage margin Vm may be secured within the voltage range of the data driver 110 for optical compensation for compensating for luminance deviation between the pixels P and in order to compensate for the threshold voltage shift of the transistor over the lapse of the driving time.

In order to compensate for the luminance difference between the first pixel area DA and the second pixel area CA, the data voltage Vdata applied to the pixels P of the second pixel area CA at high luminance may be set to a higher voltage (lower voltage in FIG. 12) than the data voltage Vdata applied to the pixels P of the first pixel area DA. As shown in FIG. 12, when the data voltage range applied to the pixels P of the second pixel area CA is extended to Vdata+Vdata', the voltage margin Vm is reduced within the output voltage range Vrange (D-IC Out) by the extended amount, so that it is difficult to secure a voltage for optical compensation and it is not possible to cope with the deterioration of the transistor over the lapse of the driving time.

The data voltage Vdata is determined according to the gamma compensation voltage. Therefore, in order to extend the data voltage range, the output voltage of the programmable gamma IC needs to be increased within the output voltage range of the data driver 110.

In the present disclosure, the driving element DT is implemented in a double gate structure in each of the sub-pixels, and a compensation voltage Vdata' is applied to a second gate electrode of the driving element DT in the second pixel area. Since the compensation voltage Vdata' cannot further increase the luminance of the pixel with only the limited data voltage Vdata, the amount of current flowing through the driving element DT may be increased to further improve the luminance of the pixel. Accordingly, in the present disclosure, the compensation voltage Vdata' is applied to the second gate electrode of the driving element disposed in the second pixel area CA, thereby compensating for the luminance difference between the first pixel area DA and the second pixel area CA without extending the data voltage range of the data driver 110 and implementing the uniform luminance on the entire screen.

The present disclosure includes a luminance compensation unit for compensating the luminance of the second pixel area CA by outputting the compensation voltage Vdata'. The power supply unit 150 or the data driver 110 may include the luminance compensation unit.

Figure 13:
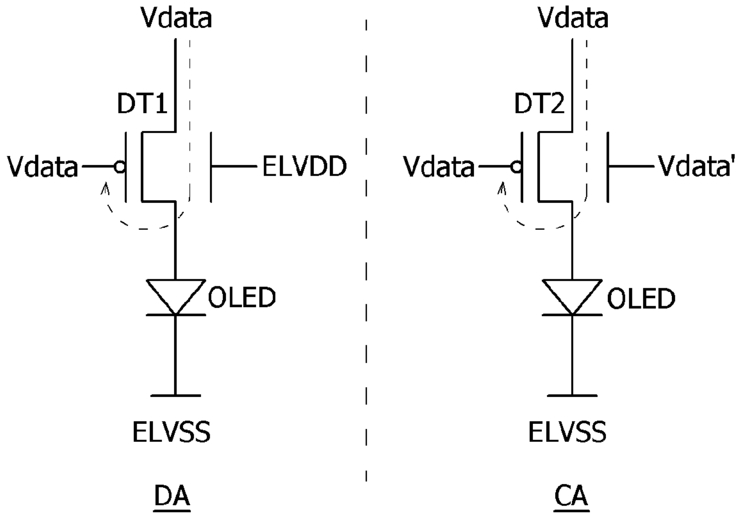
FIG. 13 is a circuit diagram schematically showing a double gate structure of driving elements according to a first embodiment of the present disclosure.
Figure 14:
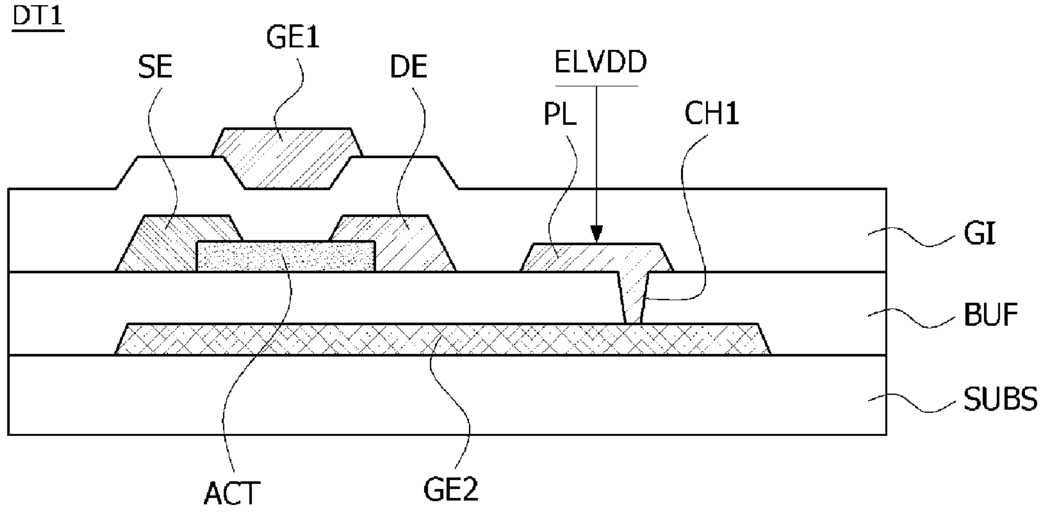
FIG. 14 is a cross-sectional view showing a cross-sectional structure of a first driving element shown in FIG. 13 according to the first embodiment of the present disclosure.
Figure 15:
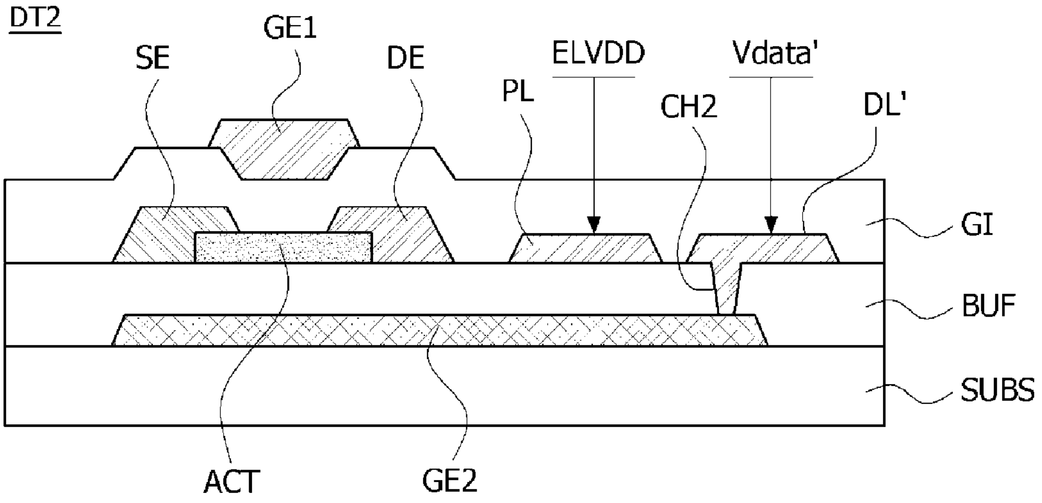
FIG. 15 is a cross-sectional view showing a cross-sectional structure of a second driving element shown in FIG. 13 according to the first embodiment of the present disclosure.

FIG. 13 is a circuit diagram showing a driving element having a double gate structure according to a first embodiment of the present disclosure. FIG. 14 is a cross-sectional view showing the cross-sectional structure of a first driving element DT1 disposed in the first pixel area DA according to the first embodiment of the present disclosure. FIG. 15 is a cross-sectional view showing the cross-sectional structure of a second driving element DT2 disposed in the second pixel area CA according to the first embodiment of the present disclosure. Each of the sub-pixels in the first pixel area DA may include the first driving element DT1 shown in FIGS. 13 and 14. Each of the sub-pixels in the second pixel area CA may include the second driving element DT2 shown in FIGS. 13 and 15.

Referring to FIGS. 13 to 15, the driving elements DT1 and DT2 in the first and second pixel areas DA and CA may be implemented as a transistor having a double gate structure having first and second gate electrodes.

The first driving element DT1 disposed in the first pixel area DA includes a first gate electrode GE1 to which the data voltage Vdata is applied, and a second gate electrode GE2 to which a DC voltage such as the pixel driving voltage ELVDD is applied. As shown in FIG. 14, the second gate electrode GE2 is disposed in the lower portion of the first driving element DT1, and overlaps the first gate electrode GE1, with a semiconductor channel ACT and insulating layers BUF and GI interposed therebetween. The second gate electrode GE2 also serves as a light shield layer that blocks external light such that light is not irradiated to the semiconductor channel ACT of the first driving element DT1. In addition, the second gate electrode GE2 of the first driving element DT1 is applied with a DC voltage such as the pixel driving voltage ELVDD to shield ions that affect the semiconductor channel ACT of the driving element DT, thereby suppressing variation in the threshold voltage Vth of the driving element DT.

Referring to FIG. 14, the first driving element DT1 includes the second gate electrode GE2 disposed on a substrate SUBS, the semiconductor channel ACT formed on a buffer layer BUF, a first electrode SE connected to a source region of the semiconductor channel ACT, a second electrode DE connected to a drain region of the semiconductor channel ACT, and the first gate electrode GE1 that overlaps the semiconductor channel ACT and the second gate electrode GE2 on a gate insulating layer GI. The buffer layer BUF is an insulating layer disposed on the substrate SUBS to cover the second gate electrode GE2. The gate insulating layer GI is an insulating layer disposed on the buffer layer BUF to cover the semiconductor channel ACT and the first and second electrodes SE and DE.

The power line PL may be disposed on the buffer layer BUF. A DC voltage such as the pixel driving voltage ELVDD may be applied to the power line PL. The power line PL may be applied to the second gate electrode GE2 of the first driving element DT1 through a first contact hole CH1 penetrating the buffer layer BUF.

The data voltage Vdata is applied to the first gate electrode GE1 of the driving element DT1, DT2 through a first switch element M01 in the pixel circuits shown in FIGS. 5 and 6. In the case of the pixel circuit shown in FIG. 7, the data voltage Vdata is applied to the first gate electrode GE1 of the driving element DT1, DT2 through the second switch element M2, the first and second electrodes of the driving element DT1, DT2, and the first switch element M1.

The second driving element DT2 disposed in the second pixel area CA includes the first gate electrode GE1 to which the data voltage Vdata is applied, and the second gate electrode GE2 to which the compensation voltage Vdata' is applied. The compensation voltage Vdata' increases the mobility of carriers flowing through the semiconductor channel ACT of the second driving element DT2 to increase the brightness of the light emitting element OLED, thereby increasing the luminance of the second pixel area CA. The compensation voltage Vdata' may be a specific voltage selected as a voltage for increasing the luminance of the second pixel area CA, or a voltage that varies depending on the luminance characteristics of the second pixel area CA or the grayscale of the pixel data.

The compensation voltage Vdata' may vary depending on the luminance characteristics and grayscale distribution characteristics of the input image. For example, based on the analysis result of the input image, as the average luminance of the image to be displayed in the second pixel area CA increases, the timing controller 130 may control the luminance compensation unit to increase the grayscale value of the compensation voltage Vdata' to further increase the luminance of the pixels, and as the average luminance of the second image decreases, the timing controller 130 may control the luminance compensation unit to decrease the grayscale value of the compensation voltage Vdata'. In addition, as the pixel data having a high grayscale value in the grayscale distribution of pixel data to be displayed in the second pixel area CA increases, the timing controller 130 mat control the luminance compensation unit to increase the grayscale value of the compensation voltage Vdata', and as the pixel data having a low grayscale value increases, the timing controller 130 may control the luminance compensation unit to decrease the grayscale value of the compensation voltage Vdata'.

The compensation voltage Vdata' may be a specific voltage selected from voltages outputted from the programmable gamma IC of the power supply unit 150. In this case, the compensation voltage Vdata' may be set to a voltage independent of the output voltage range Vrange (D-IC Out) or the data voltage range of the data driver 110.

The compensation voltage Vdata' may be outputted from the data driver 110. In this case, the compensation voltage Vdata' may have a voltage range smaller than the data voltage range set within the output voltage range Vrange (D-IC Out) of the data driver 110. For example, when the data voltage Vdata has a data voltage range of 0V to 5V, the voltage range of the compensation voltage Vdata' may be set to 0V to 3V.

The timing controller 130 may generate the compensation data with a grayscale value selected based on a result of analyzing the luminance characteristics of the input image or the grayscale characteristics of pixels in the second pixel area CA. The data driver 110 may convert the compensation data received as digital data into the gamma compensation voltage and output the compensation voltage Vdata'. In this case, the compensation voltage Vdata' may be adaptively changed according to the luminance characteristics and/or the grayscale distribution characteristics of the input image.

In the second driving element DT2, as shown in FIG. 15, the second gate electrode GE2 is disposed in the lower portion of the second driving element DT2, and overlaps the first gate electrode GE1, with the semiconductor channel ACT and the insulating layers BUF and GI interposed therebetween. The second gate electrode GE2 increases the carrier mobility of the second driving element DT2 to increase the luminance of the second pixel area CA, and also serves as a light shield layer that blocks external light such that light is not irradiated to the semiconductor channel ACT of the second driving element DT2.

Referring to FIG. 15, the second driving element DT2 includes the second gate electrode GE2 disposed on the substrate SUBS, the semiconductor channel ACT formed on the buffer layer BUF, the first electrode SE connected to the source region of the semiconductor channel ACT, the second electrode DE connected to the drain region of the semiconductor channel ACT, and the first gate electrode GE1 that overlaps the semiconductor channel ACT and the second gate electrode GE2 on the gate insulating layer GI.

The power line PL may be disposed on the buffer layer BUF. An auxiliary data line DL' to which the compensation voltage Vdata' is applied may be disposed on the buffer layer BUF. The auxiliary data line DL' may be connected to the second gate electrode GE2 of the second driving element DT2 through a second contact hole CH2 penetrating the buffer layer BUF.

Figure 16:
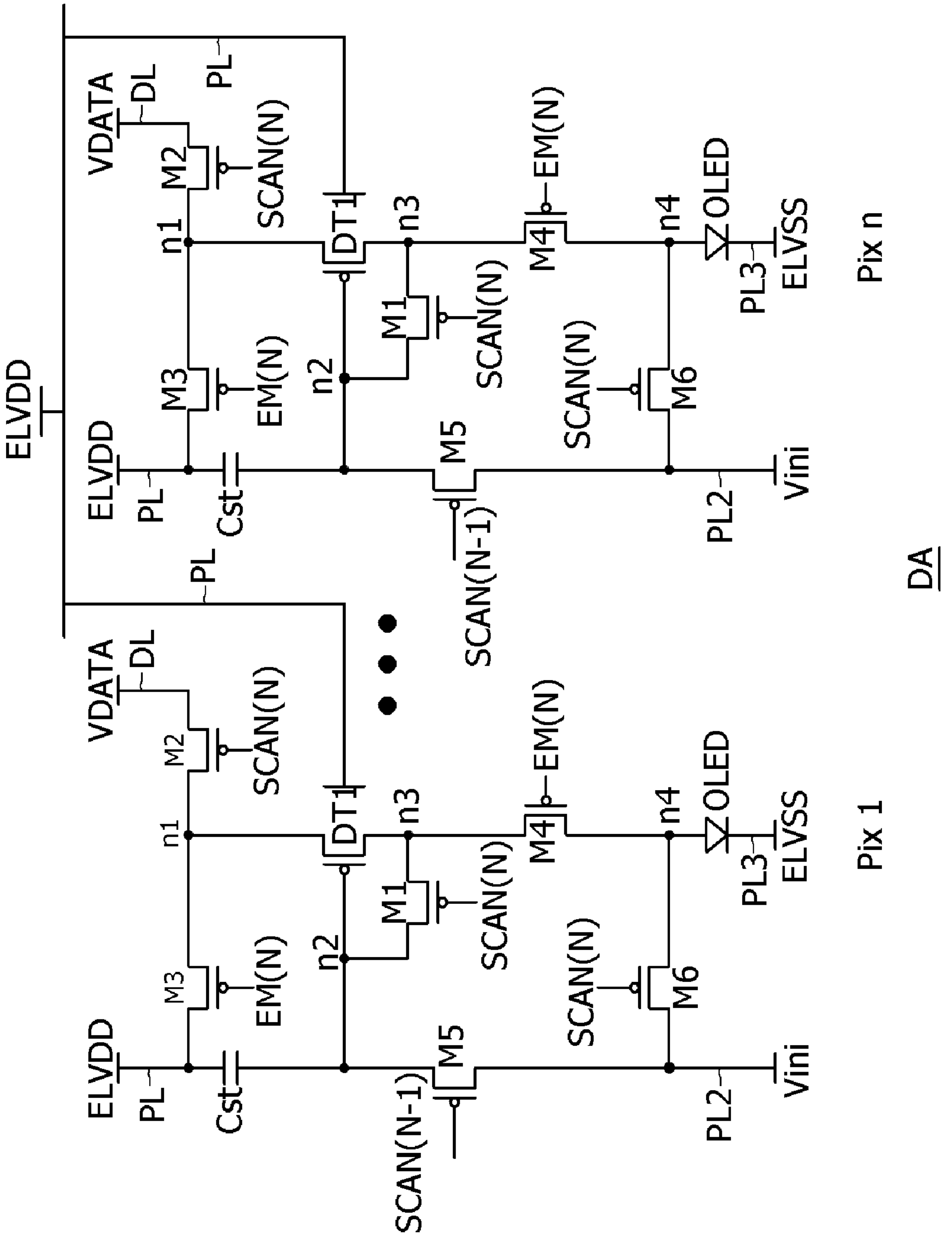
FIG. 16 is a circuit diagram illustrating an example in which a first driving element shown in FIG. 13 is applied to the pixel circuit shown in FIG. 7 according to the first embodiment of the present disclosure.
Figure 17:
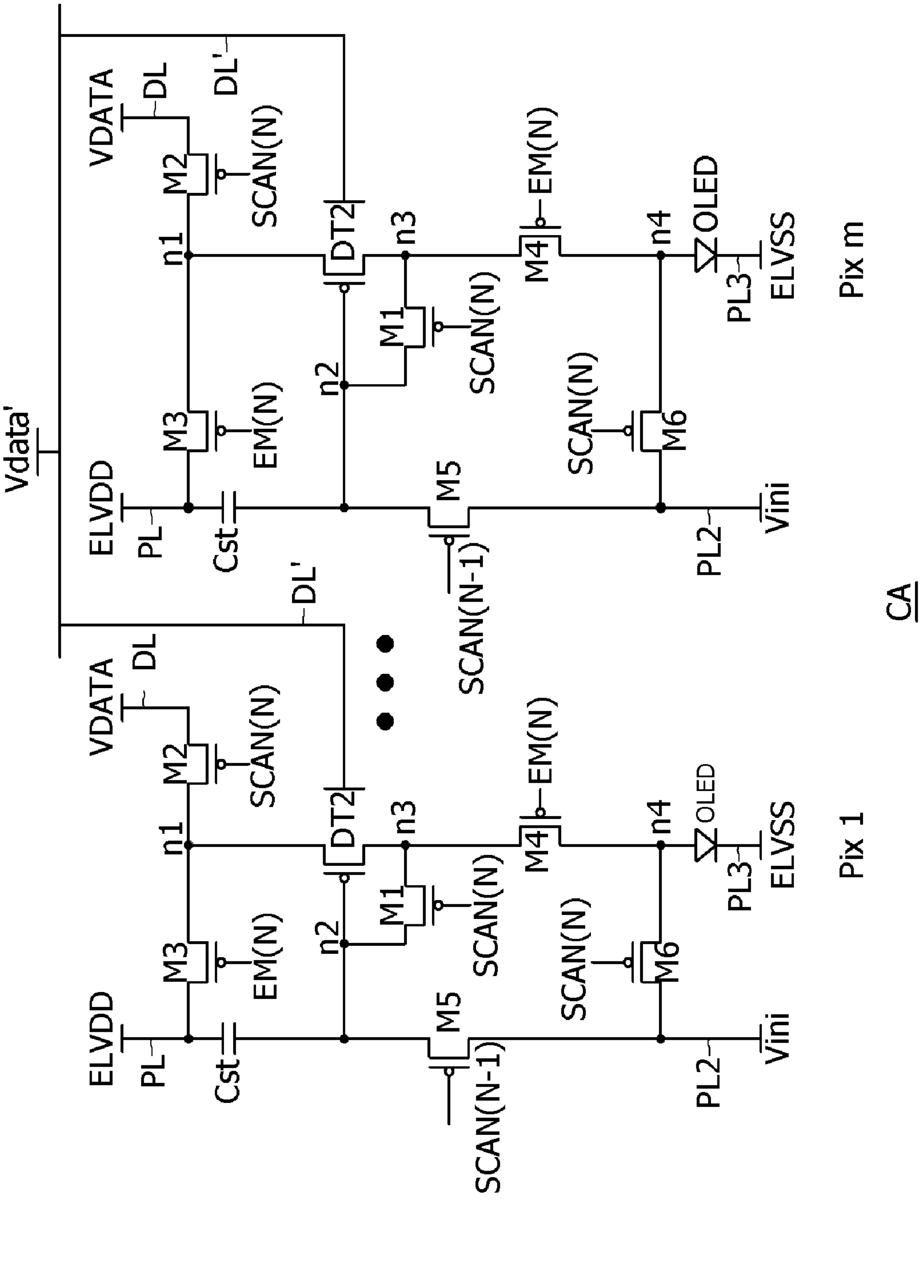
FIG. 17 is a circuit diagram illustrating an example in which a second driving element shown in FIG. 13 is applied to the pixel circuit shown in FIG. 7 according to the first embodiment of the present disclosure.

The driving elements DT1 and DT2 shown in FIGS. 13 to 15 may be applied to the pixel circuits shown in FIGS. 5 to 7. FIG. 16 is a circuit diagram illustrating an example in which the first driving element shown in FIG. 13 is applied to the pixel circuit shown in FIG. 7 according to one embodiment. FIG. 17 is a circuit diagram illustrating an example in which the second driving element shown in FIG. 13 is applied to the pixel circuit shown in FIG. 7 according to one embodiment.

In sub-pixels PIX1 to PIXn of the first pixel area DA, as shown in FIG. 16, the pixel driving voltage ELVDD may be applied to the second gate electrode of the driving element DT1. The pixel driving voltage ELVDD may be commonly applied to all the driving elements DT1 in the first pixel area DA through the power line PL.

In sub-pixels PIX1 to PIXm of the second pixel area CA, as shown in FIG. 17, the compensation voltage Vdata' may be applied to the second gate electrode of the driving element DT2. The compensation voltage Vdata' may be commonly applied to all the driving elements DT2 in the second pixel area CA through the auxiliary data line DL'.

In the example of FIG. 16, the first driving elements DT1 are commonly connected to the power line PL, so that the second gate electrodes GE2 of the first driving elements DT1 are grouped to receive the same DC voltage. In the example of FIG. 17, the second driving elements DT2 are commonly connected to the auxiliary data line DL', so that the second gate electrodes GE2 of the second driving elements DT2 are grouped to receive the same voltage. In the present disclosure, as shown in FIGS. 16 and 17, the second gate electrodes of the driving elements are grouped for each area, but the present disclosure is not limited thereto. For example, in the second pixel area CA, the auxiliary data line DL' may be divided into two or more, and may be separated for each color of sub-pixels.

Figure 18:
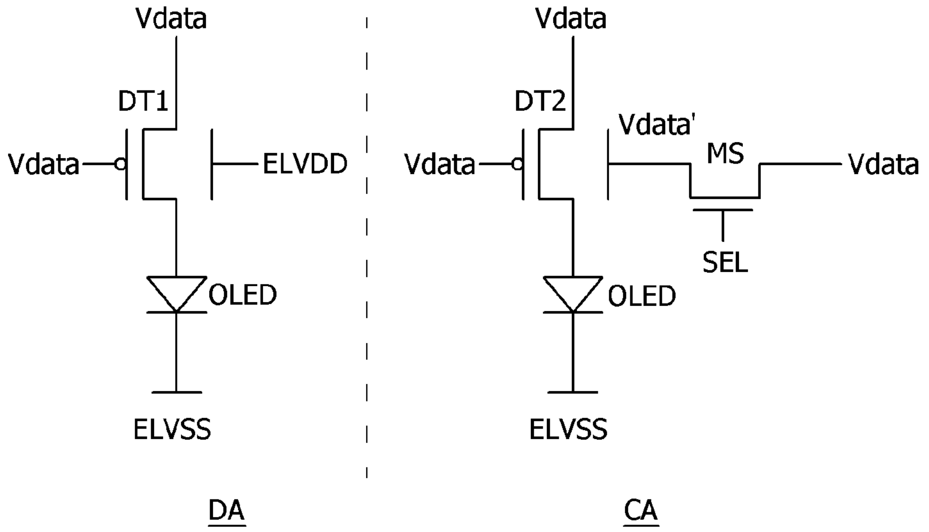
FIG. 18 is a circuit diagram schematically showing a double gate structure of driving elements according to a second embodiment of the present disclosure.
Figure 19:
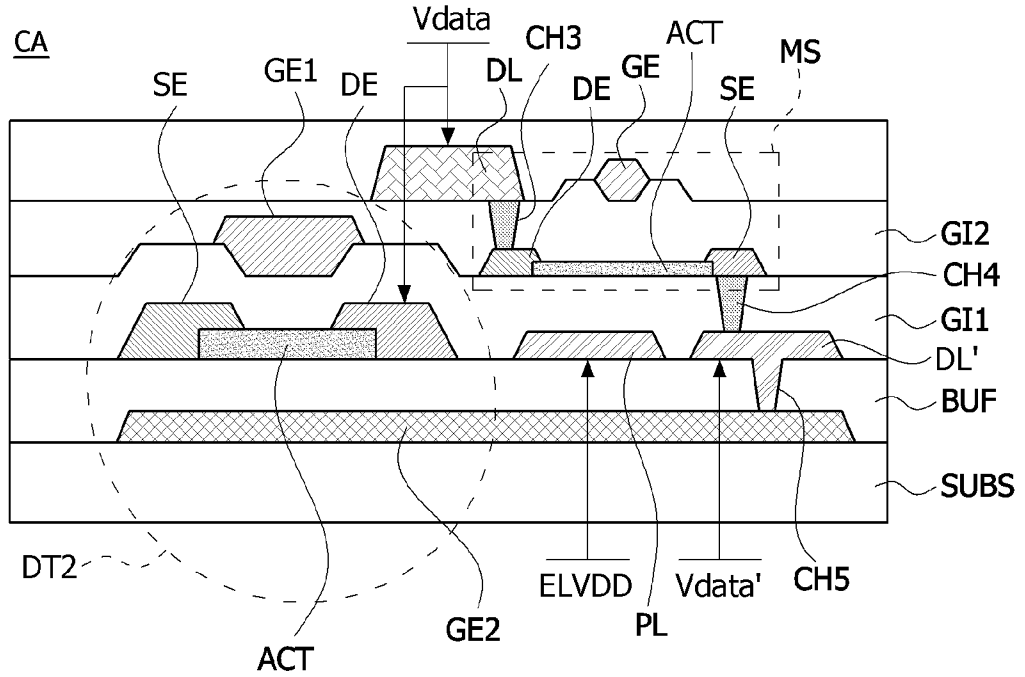
FIG. 19 is a cross-sectional view showing a cross-sectional structure of a second driving element and a switch element shown in FIG. 18 according to the second embodiment of the present disclosure.
Figure 21:
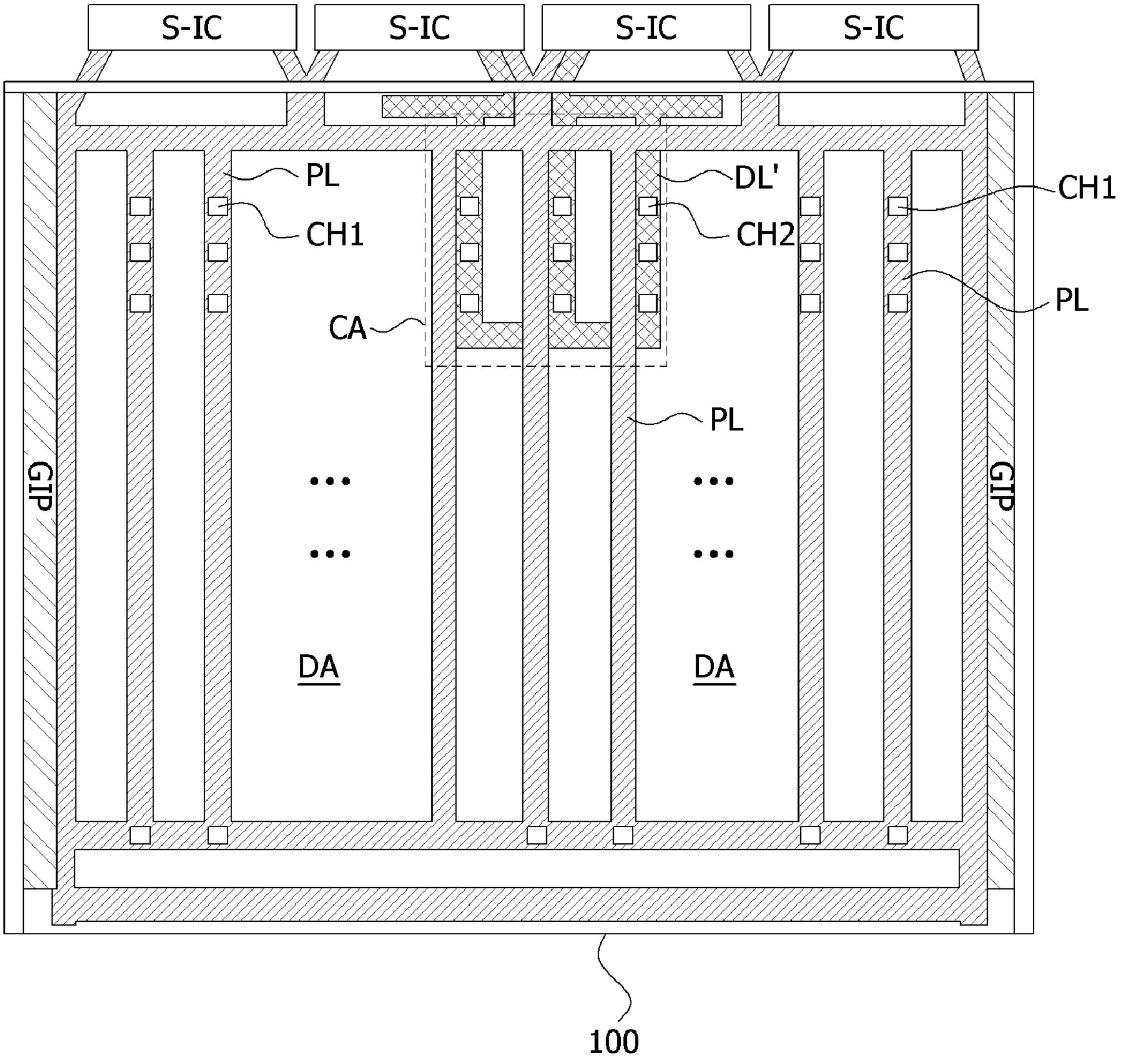
FIG. 21 is a plan view showing a power line and an auxiliary data line on a display panel according to an embodiment of the present disclosure.

FIG. 18 is a circuit diagram schematically showing a double gate structure of driving elements according to a second embodiment of the present disclosure. FIG. 19 is a cross-sectional view showing a cross-sectional structure of the second driving element DT2 and a switch element MS shown in FIG. 18 according to the second embodiment of the present disclosure. In FIGS. 18 and 19, components that are substantially the same as those of the embodiment shown in FIG. 21 are denoted by the same reference numerals, and detailed descriptions thereof are omitted.

Referring to FIGS. 18 and 19, a DC voltage such as the pixel driving voltage ELVDD may be applied to the second gate electrode GE2 of the first driving element DT1 through the first contact hole CH1.

The data voltage Vdata is applied to the first gate electrode GE1 of the driving element DT1, DT2 through the first switch element M01 in the pixel circuits shown in FIGS. 5 and 6. In the case of the pixel circuit shown in FIG. 7, the data voltage Vdata is applied to the first gate electrode GE1 of the driving element DT1, DT2 through the second switch element M2, the first and second electrodes of the driving element DT1, DT2, and the first switch element M1.

Each of the sub-pixels in the second pixel area CA further includes a switch element MS for switching the compensation voltage Vdata' applied to the second gate electrode GE2 of the second driving element DT2. The switch element MS is turned on in response to the pulse of a selection signal SEL. When the switch element MS is turned on, the data line DL is connected to the second gate electrode GE2 of the second driving element DT2, so that the compensation voltage Vdata is applied to the second gate electrode GE2. Under the control of the timing controller 130, the gate driver 120 may output the pulse of the selection signal SEL to supply the selection signal SEL to the gate line to which the gate electrode of the switch element MS is connected.

In the example of FIGS. 18 and 19, the switch element MS is connected to the data line DL to apply the data voltage Vdata, as the compensation voltage Vdata', to the second gate electrode GE2 of the second driving element DT2, but the present disclosure is not limited thereto. For example, the switch element MS may be connected to the auxiliary data line DL' to which the compensation voltage Vdata' is applied from the power supply unit 150 or the data driver 110, so that the compensation voltage Vdata' from the auxiliary data line DL' may be applied to the second gate electrode GE2 of the second driving element DT2. Accordingly, the compensation voltage Vdata' may be the same as the data voltage Vdata, or may be a specific voltage, or a variable voltage.

Referring to FIG. 19, the second driving element DT2 includes the second gate electrode GE2 disposed on the substrate SUBS, the semiconductor channel ACT formed on the buffer layer BUF, the first electrode SE connected to the source region of the semiconductor channel ACT, the second electrode DE connected to the drain region of the semiconductor channel ACT, and the first gate electrode GE1 that overlaps the semiconductor channel ACT and the second gate electrode GE2 on a first gate insulating layer GI1. The buffer layer BUF is an insulating layer disposed on the substrate SUBS to cover the second gate electrode GE2. The first gate insulating layer GI1 is an insulating layer disposed on the buffer layer BUF to cover the semiconductor channel ACT and the first and second electrodes SE and DE.

The switch element MS includes the semiconductor channel ACT disposed on the first gate insulating layer GI1, the first electrode SE connected to the source region of the semiconductor channel ACT, the second electrode DE connected to the drain region of the semiconductor channel ACT, and the gate electrode GE that overlaps the semiconductor channel ACT on a second gate insulating layer GI2. The second gate insulating layer GI2 is an insulating layer disposed on the first gate insulating layer GI1 to cover the first gate electrode GE1 of the driving element DT2, the semiconductor channel ACT of the switch element MS, and the first and second electrodes SE and DE.

The data line DL may be connected to the second electrode DE of the switch element MS through a third contact hole CH3 penetrating the second gate insulating layer GI2. The first electrode SE of the switch element MS is connected to the auxiliary data line DL' through a fourth contact hole CH4 penetrating the first gate insulating layer GI1. The auxiliary data line DL' is connected to the second gate electrode GE2 of the driving element DT2 through a fifth contact hole CH5 penetrating the buffer layer BUF.

The data voltage Vdata is applied to the first gate electrode GE1 of the driving element DT1, DT2 through the first switch element M01 in the pixel circuits shown in FIGS. 5 and 6. In the case of the pixel circuit shown in FIG. 7, the data voltage Vdata is applied to the first gate electrode GE1 of the driving element DT1, DT2 through the second switch element M2, the first and second electrodes of the driving element DT1, DT2, and the first switch element M1.

Figure 20:
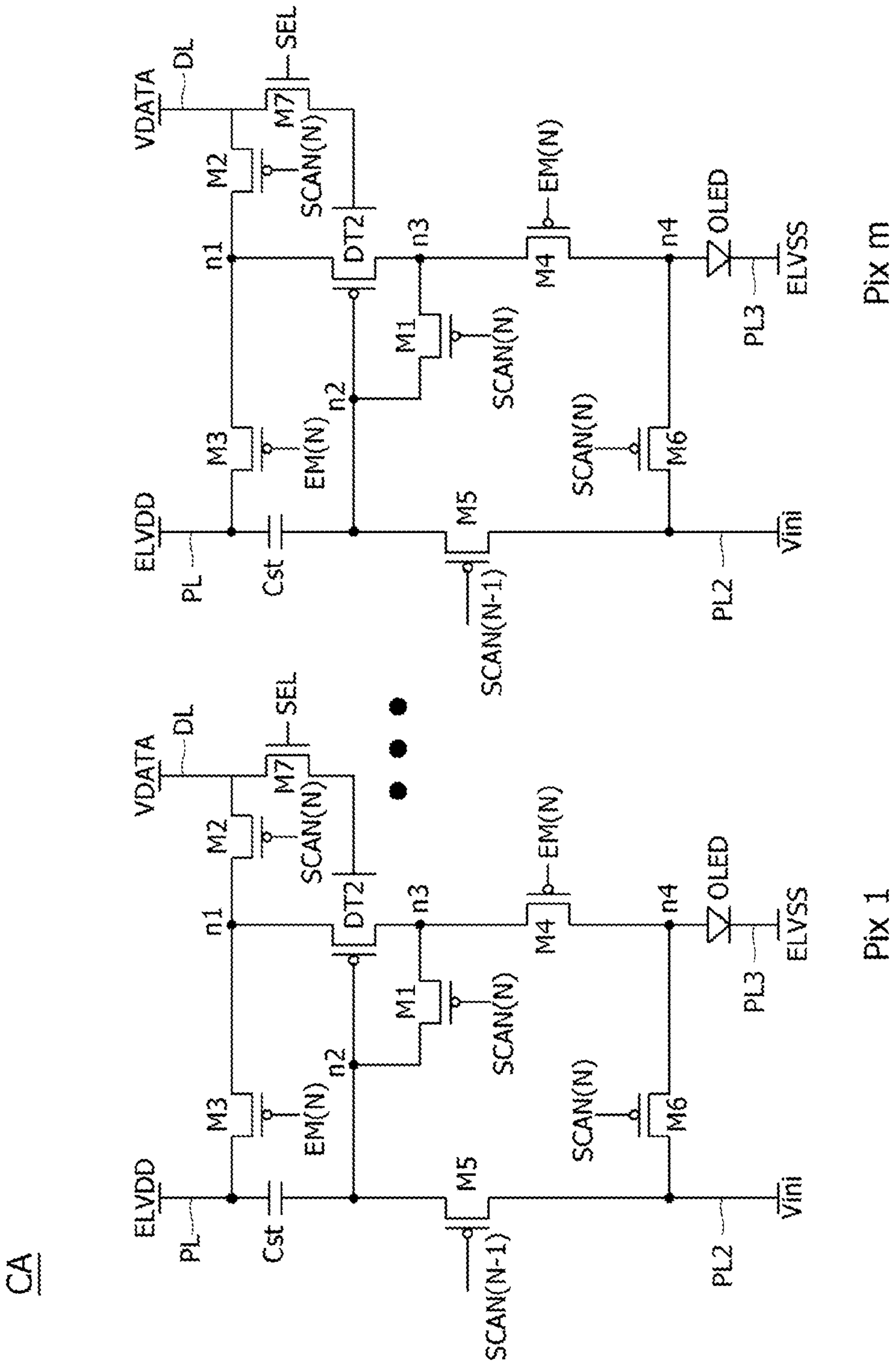
FIG. 20 is a circuit diagram illustrating an example in which a second driving element and a switch element shown in FIG. 18 are applied to the pixel circuit shown in FIG. 7 according to the second embodiment of the present disclosure.

The driving elements DT1 and DT2 shown in FIGS. 18 and 19 may be applied to the pixel circuits shown in FIGS. 5 to 7. FIG. 20 is a circuit diagram illustrating an example in which the second driving element DT2 shown in FIG. 18 is applied to the pixel circuit shown in FIG. 7.

A DC voltage such as the pixel driving voltage ELVDD may be applied, as shown in FIG. 16, to the second gate electrode of the driving element DT1 disposed in the sub-pixels PIX1 to PIXn of the first pixel area DA.

In the sub-pixels PIX1 to PIXm of the second pixel area CA, as shown in FIG. 20, the compensation voltage Vdata' may be applied to the second gate electrode of the driving element DT2 through a seventh switch element M7. The seventh switch element M7 includes a gate electrode connected to the gate line to which the selection signal SEL is applied, a first electrode connected to the data line DL, and a second electrode connected to the second gate electrode GE2 of the driving element DT2.

FIG. 21 is a plan view illustrating a power line PL and an auxiliary data line DL' on the display panel 100 according to one embodiment.

Referring to FIG. 21, the display device may include a plurality of drive ICs S-IC. The data driver 110 may be integrated in each of the drive ICs S-IC. The drive ICs S-IC may be adhered to the display panel 100 in the form of a chip on film (COF) or a chip on glass (COG). In FIG. 21, "GIP" is a circuit area including the gate driver 120.

In the drive ICs S-IC, channels connected to the data lines in the first pixel area and channels connected to the data lines in the second pixel area output the data voltage Vdata. Since the luminance of the second pixel area CA increases due to a separate compensation voltage Vdata' applied to the sub-pixels of the second pixel area CA, there is no need to increase the channel voltage of the second pixel area of the drive IC S-IC. As a result, the channels of the drive ICs S-IC have the output voltage ranges Vrange that are set to be substantially the same regardless of the area, so that a sufficient voltage margin Vm may be secured in all channels.

The power line PL is connected to all sub-pixels in the first and second pixel area DA and CA to supply the pixel driving voltage ELVDD to the pixel circuits. The power line PL is connected to the second gate electrode GE2 of the first driving element DT1 disposed in the first pixel area DA through the first contact hole CH1 shown in FIG. 14. The power line PL may be applied, as shown in FIGS. 5 to 7, to the first electrode of the second driving element DT2 in the pixel circuit disposed in the second pixel area CA.

The auxiliary data line DL' is connected to the sub-pixels of the second pixel area CA. The auxiliary data line DL' is separated from the sub-pixels of the first pixel area DA. The auxiliary data line DL' may be commonly connected to all sub-pixels in the second pixel area CA. The auxiliary data line DL' applies the compensation voltage Vdata' received from the power supply unit 150 or the channel of the drive IC S-IC to the sub-pixels of the second pixel area CA. The auxiliary data line DL' is connected to the second gate electrode GE2 of the second driving element DT2 through the second contact hole CH2 shown in FIG. 15, or is connected to the second gate electrode GE2 of the second driving element DT2 through the switch element MS and the contact holes CH3 and CH4 shown in FIG. 19.

Figure 22:
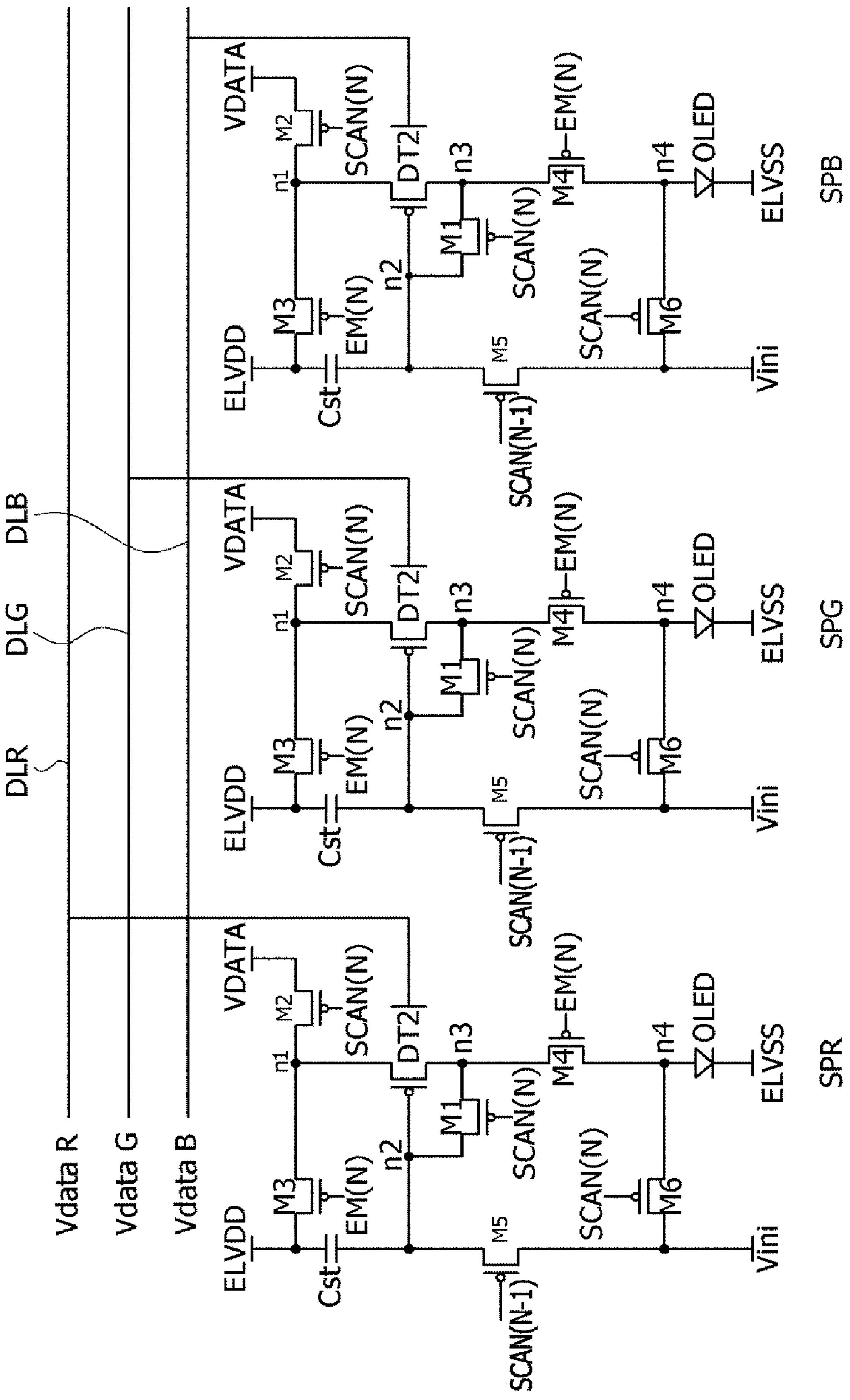
FIG. 22 is a circuit diagram illustrating an example in which an optimized compensation voltage is applied differently for each color of sub-pixels arranged in a second pixel area according to an embodiment of the present disclosure.
Figure 23:
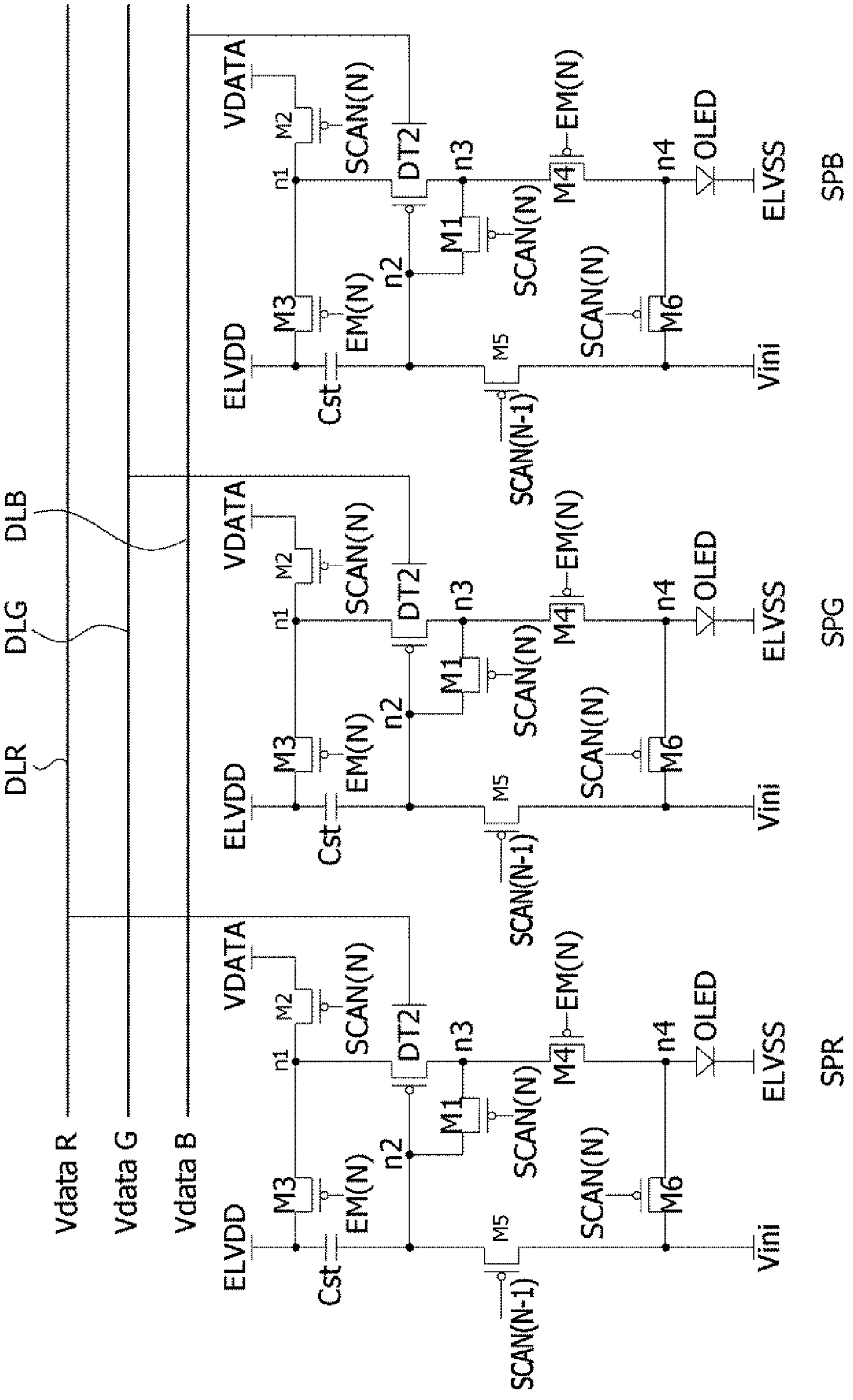
FIG. 23 is a diagram showing an output voltage range of a data driver and a compensation voltage for each color according to an embodiment of the present disclosure.

The light emitting element OLED may have different luminous efficiency for each color. Accordingly, the data voltage Vdata is optimized for each color of the sub-pixels. FIGS. 22 and 23 show an embodiment in which the voltage applied to the driving element DT2 of the second pixel area CA is separated for each color in consideration of the luminous efficiency and data voltage for each color of the sub-pixels.

FIG. 22 is a circuit diagram illustrating an example in which an optimized compensation voltage is applied differently for each color of sub-pixels arranged in the second pixel area CA according to one embodiment. FIG. 23 is a diagram showing an output voltage range of a data driver and a compensation voltage for each color according to one embodiment.

Referring to FIGS. 22 and 23, a first auxiliary data line DLR is connected to R sub-pixels SPR to apply a compensation voltage +VR for improving the luminance of the R sub-pixels SPR to the R sub-pixels SPR. The compensation voltage +VR is applied to the second gate electrode GE2 of the second driving element DT2 disposed in the R sub-pixel SPR. A second auxiliary data line DLG is connected to G sub-pixels SPG to apply a compensation voltage +VG for improving the luminance of the G sub-pixels SPG to the G sub-pixels SPG. The compensation voltage +VG is applied to the second gate electrode GE2 of the second driving element DT2 disposed in the G sub-pixel SPG. A third auxiliary data line DLB is connected to B sub-pixels SPB to apply a compensation voltage +VB for improving the luminance of the B sub-pixels SPB to the B sub-pixels SPB. The compensation voltage +VB is applied to the second gate electrode GE2 of the second driving element DT2 disposed in the B sub-pixel SPB.

In consideration of the color difference and luminous efficiency for each color, as shown in FIG. 23, a data voltage Vdata G applied to the G sub-pixel SPG among RGB sub-pixels is set to the smallest, and a data voltage Vdata B applied to the B sub-pixel SPB is set to the largest. When the compensation voltage Vdata' is applied as the same voltage to the RGB sub-pixels at the same high grayscale, the luminance of the G sub-pixel SPG having the highest luminous efficiency is increased, so that a greenish color may be visually recognized in an image reproduced on the screen. Accordingly, the compensation voltages +VR, +VG, and +VB may be set to different voltages for each color. For example, as shown in FIG. 23, the compensation voltage +VB applied to the B sub-pixel SPB may be set to a voltage greater than the compensation voltages +VR and +VG applied to the R and G sub-pixels SPR and SPG. The compensation voltage +VG applied to the G sub-pixel SPG may be set to a voltage smaller than the compensation voltages +VR and +VB applied to the R and B sub-pixels SPR and SPB.

Figure 24:
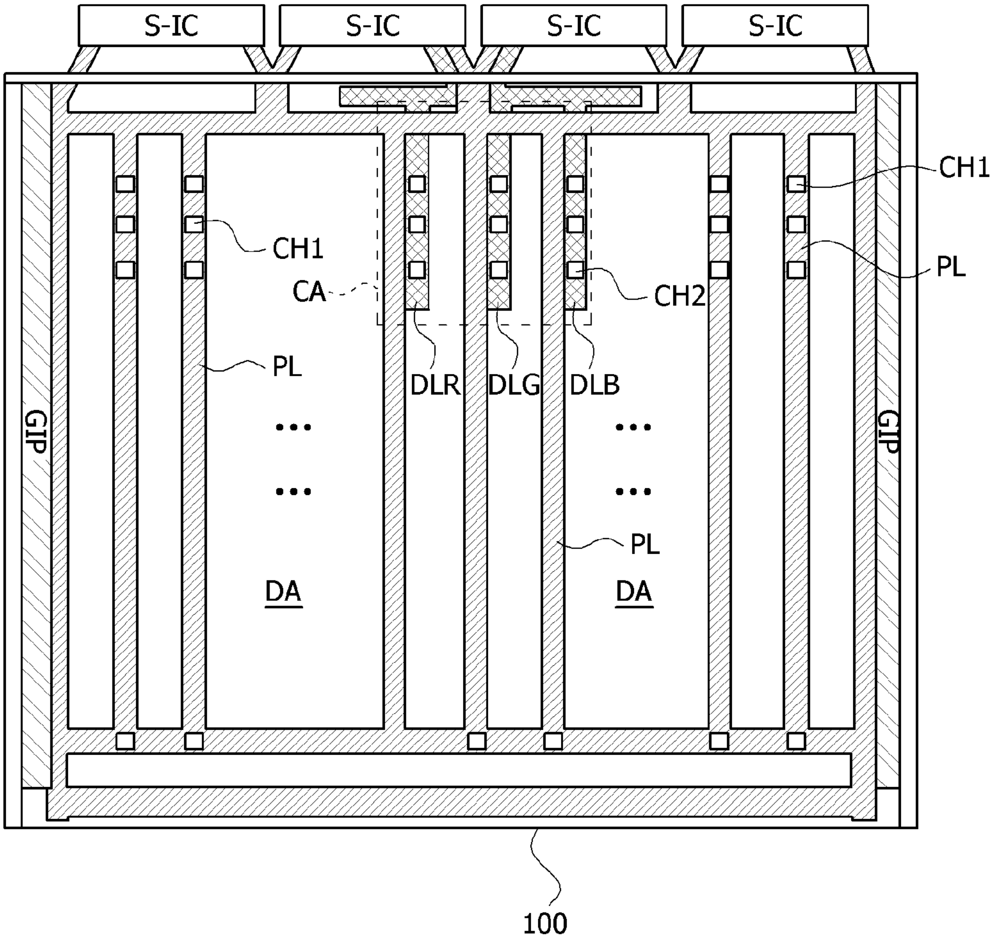
FIG. 24 is a plan view showing an auxiliary data line separated for each color and a power line on a display panel according to an embodiment of the present disclosure.

FIG. 24 is a plan view illustrating the power line PL and the auxiliary data lines DLR, DLG, and DLB separated for each color on the display panel 100 according to one embodiment. In FIG. 24, components that are substantially the same as those of the embodiment shown in FIG. 21 are denoted by the same reference numerals, and detailed descriptions thereof are omitted.

Referring to FIG. 24, the first auxiliary data line DLR is connected to the R sub-pixels SPR of the second pixel area CA. The second auxiliary data line DLG is connected to the G sub-pixels SPG of the second pixel area CA. The third auxiliary data line DLB is connected to the B sub-pixels SPB of the second pixel area CA. The auxiliary data lines DLR, DLG, and DLB are separated from the sub-pixels of the first pixel area DA.

Figure 25:
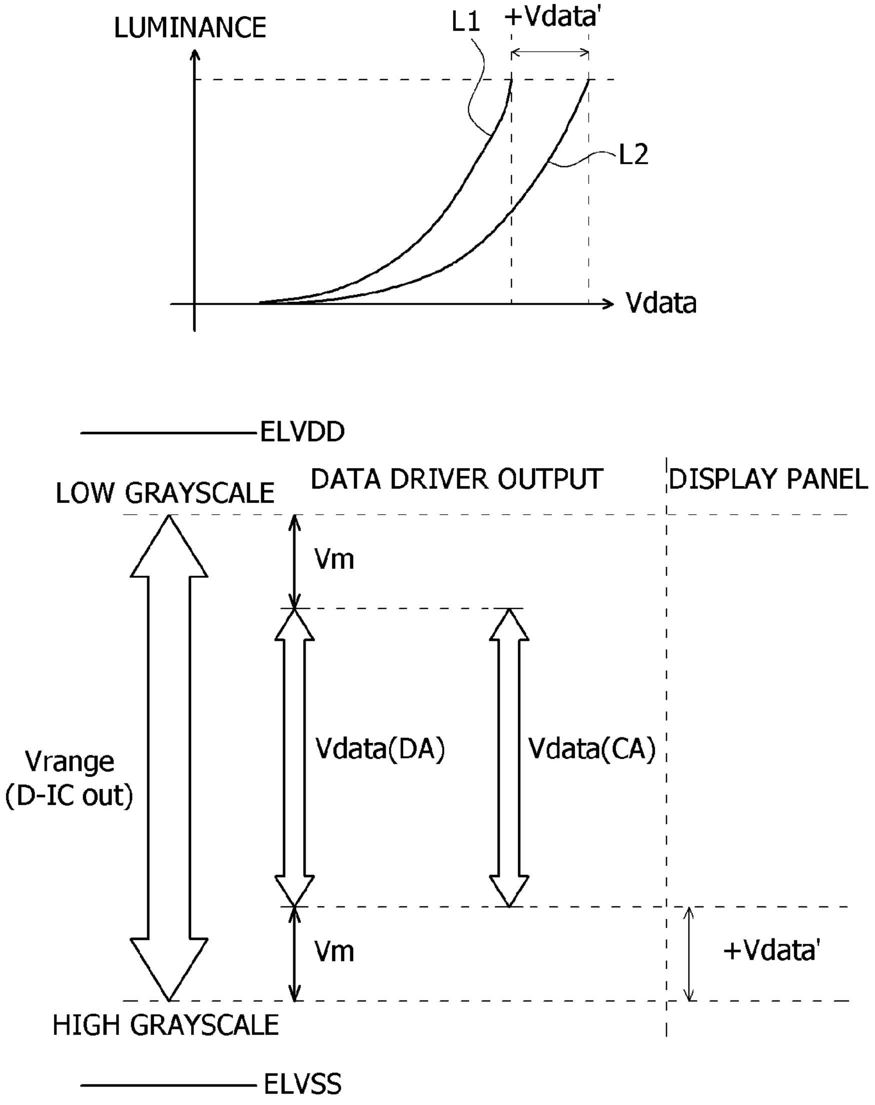
FIG. 25 is a diagram illustrating an effect of improving luminance in a second pixel area by using an output voltage of a data driver having a voltage margin secured and a compensation voltage applied to a display panel according to an embodiment of the present disclosure.

The data driver 110 of the present disclosure includes a plurality of first channels for outputting the data voltage Vdata to the data lines DL of the first pixel area DA, and a plurality of second channels for outputting the data voltage to the data lines DL of the second pixel area CA. The output voltage ranges Vrange of the first and second channels are set to be the same. Data voltage ranges Vdata(DA) and Vdata(CA) outputted from the first and second channels of the data driver 110 are set equally within the output voltage range Vrange as shown in FIG. 25. The output voltage range Vrange of the first and second channels includes the voltage margin Vm greater than the data voltage ranges Vdata(DA) and Vdata(CA) and the voltage margin Vm smaller than the data voltage ranges Vdata(DA) and Vdata(CA). The voltage margins Vm of the first and second channels are substantially the same.

FIG. 25 is a diagram showing an effect of improving the luminance of the second pixel area CA by using the output voltage range Vrange of the data driver 110 in which the voltage margin Vm is secured and the compensation voltage Vdata' applied to the display panel 100 according to one embodiment.

Referring to FIG. 25, the output voltage range Vrange of the data driver 110 includes the data voltages Vdata(DA) and Vdata(CA) applied to the sub-pixels of the first and second pixel areas DA and CA, and voltage margin Vm. The data voltage ranges applied to the pixels in the first and second pixel areas DA and CA are set to be substantially the same. In FIG. 25, "Vdata(DA)" is a data voltage applied to the sub-pixels of the first pixel area DA. "Vdata(CA)" is a data voltage applied to the sub-pixels of the second pixel area CA.

The voltage margin Vm may be used as an optical compensation voltage, i.e., a voltage that compensates for a shift of the threshold voltage Vth due to deterioration of the driving elements DT1 and DT2 over the passage of a driving time. Since a sufficiently secured voltage margin Vm may optically compensate for the luminance deviation of the sub-pixels at high resolution, the accuracy of optical compensation may be improved, and a data voltage variable range for image quality compensation according to changes over time may be secured.

The present disclosure uses the compensation voltage Vdata' applied to the second gate electrode of the second driving element DT2 to improve the luminance of the second pixel area CA without reducing the voltage margin Vm in the output voltage range Vrange of the data driver 110. The compensation voltage Vdata' is outputted from the power supply unit 150 independent of the data driver 110, or is generated as a specific voltage or a variable voltage within the data voltage range.

Figure 26:
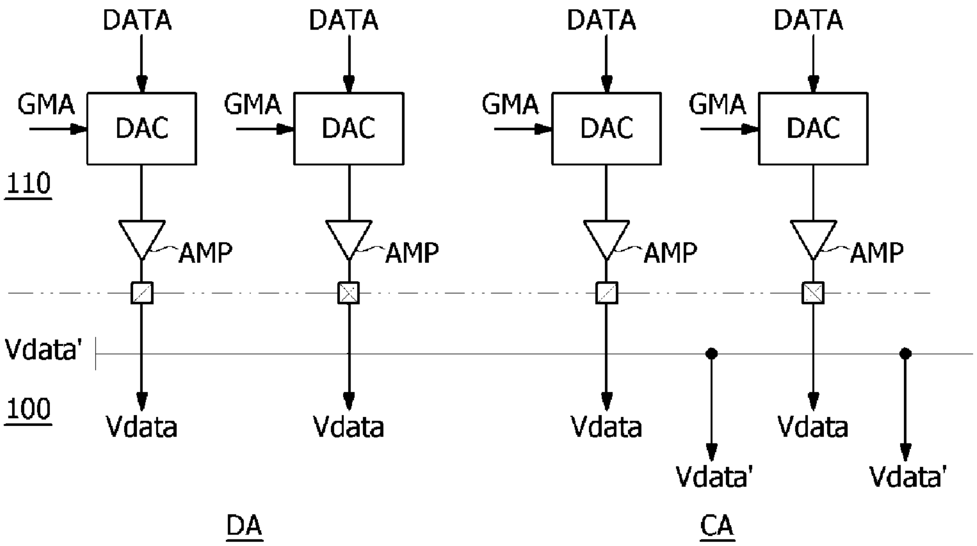
FIG. 26 is a diagram illustrating an example in which a compensation voltage is transmitted to a data driver through an independent path according to an embodiment of the present disclosure.

FIG. 26 is a diagram illustrating an example in which a compensation voltage is transmitted to a data driver through an independent path according to one embodiment.

Referring to FIG. 26, each of the channels of the data driver 110 includes the DAC that converts pixel data DATA into a gamma compensation voltage GMA to output the data voltage Vdata, and an output buffer AMP that is connected to an output node of the DAC and supplies the data voltage Vdata to the data lines DL. The output voltage range Vrange and the data voltage Vdata of the data driver 110 are as shown in FIG. 25.

The compensation voltage Vdata' may be generated from the power supply unit 150 independent of the data driver 110 and applied to the sub-pixels arranged in the second pixel area of the display panel 100. The compensation voltage Vdata' is supplied to the auxiliary data line DL' of the second pixel area CA. The compensation voltage Vdata' may be set as a voltage optimized for each color of the sub-pixels and applied to the sub-pixels of the second pixel area CA through the auxiliary data lines separated for each color.

Figure 27:
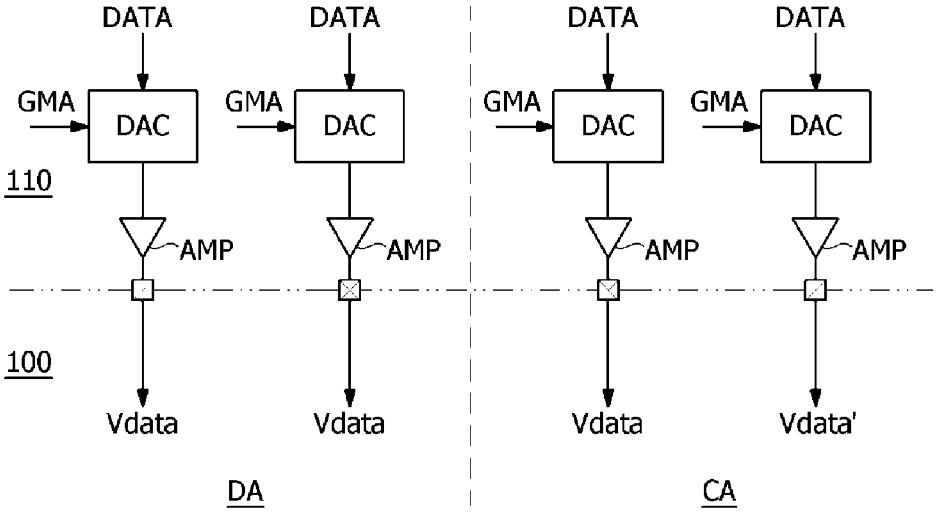
FIGS. 27 and 28 are diagrams illustrating an example in which a compensation voltage is outputted from a channel of a data driver according to an embodiment of the present disclosure.
Figure 28:
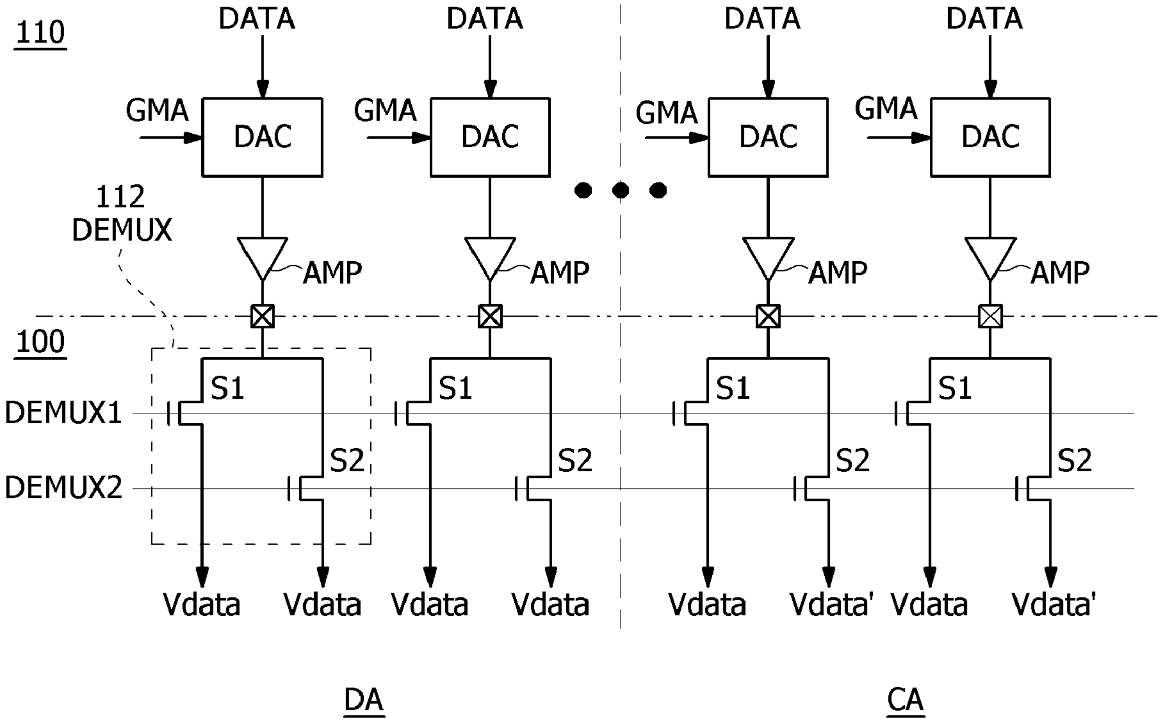

FIGS. 27 and 28 are diagrams illustrating an example in which a compensation voltage is outputted from a channel of a data driver according to one embodiment.

Referring to FIG. 27, each of the channels of the data driver 110 includes the DAC that converts the pixel data DATA into the gamma compensation voltage GMA to output the data voltage Vdata, and the output buffer AMP that is connected to an output node of the DAC and supplies the data voltage Vdata to the data lines DL. The output voltage range Vrange and the data voltage Vdata of the data driver 110 are as shown in FIG. 25.

Some channels of the data driver 110 may convert the compensation data from the timing controller 130 into the compensation voltage Vdata' and may output it. The output voltage range Vrange and the data voltage range of these channels are the same as those of other channels that output the data voltage Vdata of the pixel data DATA.

The compensation voltage Vdata' outputted from the channel of the data driver 110 is supplied to the auxiliary data line DL' of the second pixel area CA. The compensation voltage Vdata' may be set as a voltage optimized for each color of the sub-pixels and applied to the sub-pixels of the second pixel area CA through the auxiliary data lines separated for each color.

Referring to FIG. 28, the demultiplexer 112 may be connected between the channels of the data driver 110 and data lines DL and DL' to reduce the number of channels of the data driver 110. In this embodiment, the data driver 110 may output the compensation voltage Vdata' together with the data voltage Vdata without increasing the number of channels. The output voltage range Vrange and the data voltage Vdata of the data driver 110 are as shown in FIG. 25.

As an example of the demultiplexer 112, a 1:2 demultiplexer DEMUX may be used. The demultiplexer 112 includes a first 1:2 demultiplexer connected to the data lines DL of the first pixel area DA, and a second 1:2 demultiplexer connected to the data line DL and the auxiliary data line DL' of the second pixel area CA. These demultiplexers include first and second switch elements S1 and S2 that are alternately turned on/off under the control of the timing controller 130. When the first switch element S1 is turned on in response to a first control signal DEMUX1, the second switch element S2 is turned off. Subsequently, when the second switch element S2 is turned on in response to a second control signal DEMUX2, the first switch element S1 is turned off.

The first 1:2 demultiplexer alternately connects one channel of the data driver 110 to two data lines DL. The first 1:2 demultiplexer time-divisionally distributes the data voltage Vdata outputted from one channel of the data driver 110 to two data lines of the first pixel area DA through the first and second switch elements S1 and S2.

The second 1:2 demultiplexer alternately connects one channel of the data driver 110 to one data line DL and one auxiliary data line DL'. The second 1:2 demultiplexer supplies the data voltage Vdata outputted from one channel of the data driver 110 to a first data line DL of the second pixel area CA through the first switch element S1, and to the auxiliary data line DL' of the second pixel area CA through the second switch element S2.

If the luminance of the second pixel area CA is low or there are few pixels of high grayscale in the grayscale distribution of pixel data written to the pixels of the second pixel area, there is almost no difference in luminance between the first pixel area DA and the second pixel area CA, so that the luminance difference between the areas may not be visually recognized. Accordingly, when there are few high grayscale pixels in the low luminance image or the second pixel area, the present disclosure does not compensate for the luminance of the second pixel area CA, and does not apply the compensation voltage Vdata' to the driving element DT2 disposed in the second pixel area CA. In this case, the pixels in the second pixel area CA are driven with the data voltage Vdata, without the compensation voltage Vdata'. Luminance compensation methods of FIGS. 29 to 32 may be controlled by the data operation unit of the timing controller 130 or the host system 200.

Figure 29:
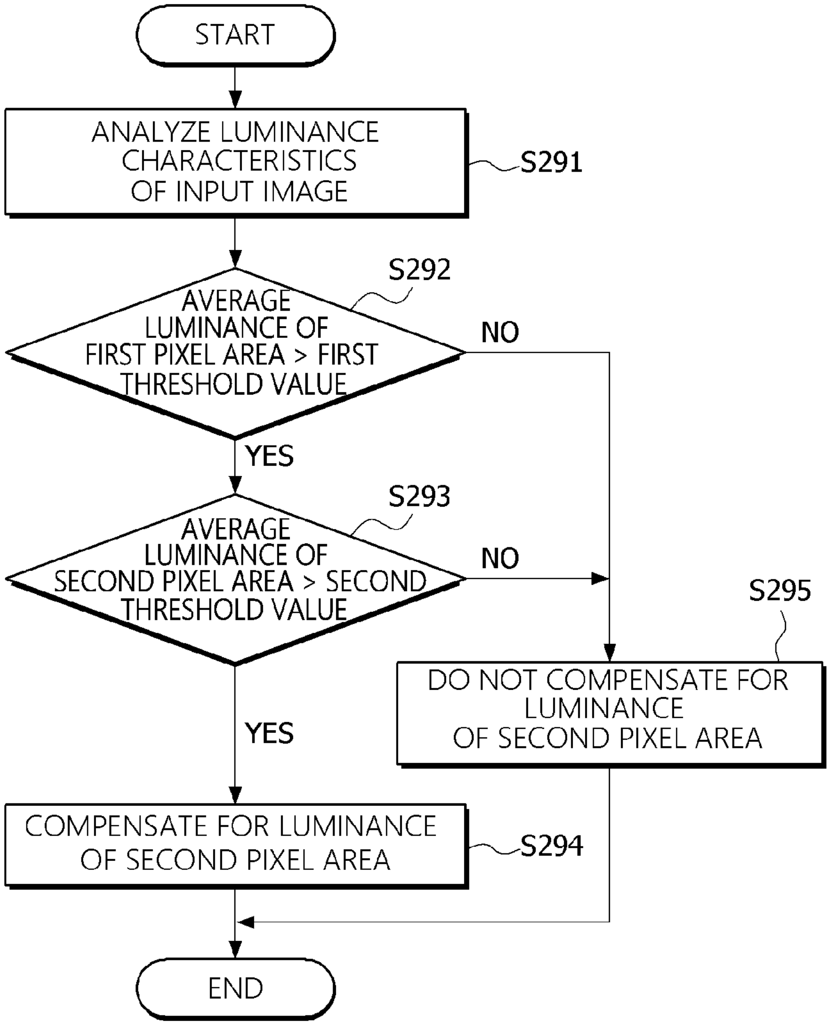
FIG. 29 is a flowchart showing a method of compensating for luminance of a screen according to a first embodiment of the present disclosure.

FIG. 29 is a flowchart illustrating a method of compensating for luminance of a screen according to a first embodiment of the present disclosure.

Referring to FIG. 29, the timing controller 130 stores the pixel data of the input image in a memory. The timing controller 130 analyzes one frame of pixel data (hereinafter, referred to as "one frame data") for each frame period to analyze the luminance characteristics of the input image (step S291). One frame data includes pixel data to be written all pixels in the screen. Accordingly, one frame data includes pixel data of the first and second pixel areas DA and CA of the screen.

The timing controller 130 may determine a cumulative distribution for each grayscale by calculating a histogram for the pixel data of one frame. The histogram is a cumulative distribution function for each grayscale of the pixel data. The timing controller 130 calculates an average picture level (referred to as "APL") based on the histogram and determines the average luminance of each of the first and second pixel areas DA and CA.

The timing controller 130 compares the average luminance of the first pixel area DA with a preset first threshold value, and compares the average luminance of the second pixel area CA with a preset second threshold value (steps S292 and S293). The first and second threshold values may be set based on a result of the image quality experiment, and these threshold values may be the same or different values.

When the average luminance of the first pixel area DA is greater than the first threshold value and the average luminance of the second pixel area CA is greater than the second threshold value, the timing controller 130 compensates for the luminance of the second pixel area CA by improving the luminance of the second pixel area CA so that the luminance difference between the first and second pixel areas DA and CA is not visually recognized (steps S292, S293, and S294). In this case, the image reproduced on the screen is a bright image with high luminance. As in the above-described embodiments, the luminance of the second pixel area CA may be compensated by a method of applying the compensation voltage Vdata' to the second gate electrodes GE2 of the driving elements DT2 disposed in the second pixel area CA. The power supply unit 150 or the data driver 110 outputs the compensation voltage Vdata' under the control of the timing controller 130.

The timing controller 130 does not compensate for the luminance of the second pixel area CA when the average luminance of the first pixel area DA is less than or equal to the first threshold value or the average luminance of the second pixel area CA is less than or equal to the second threshold value (step S295). In this case, the image reproduced on the screen is a low luminance image that is relatively dark compared to a high luminance image. In step S295, the power supply unit 150 or the data driver 110 does not output the compensation voltage Vdata' under the control of the timing controller 130. Accordingly, in step S295, the second gate electrodes GE2 of the driving elements DT2 disposed in the second pixel area CA may be floated since the compensation voltage Vdata' is not applied thereto.

Figure 30:
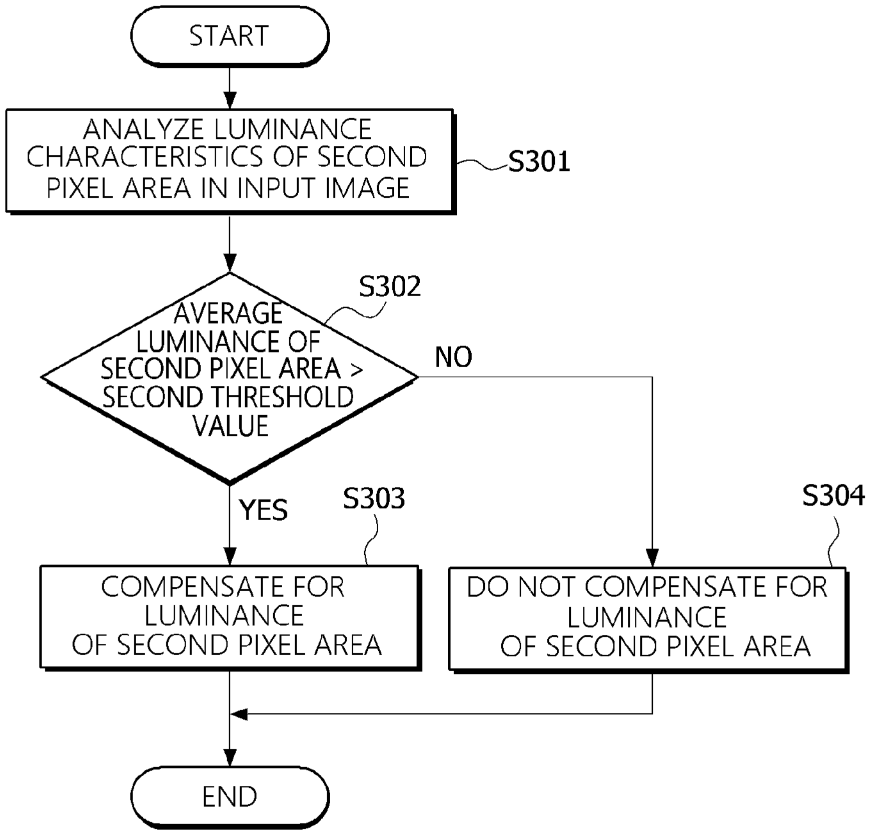
FIG. 30 is a flowchart showing a method of compensating for luminance of a screen according to a second embodiment of the present disclosure.

FIG. 30 is a flowchart illustrating a method of compensating for luminance of a screen according to a second embodiment of the present disclosure. This embodiment may reduce the amount of data computation for calculating the average luminance.

Referring to FIG. 30, the timing controller 130 analyzes the luminance characteristics of the second pixel area image based on the result of calculating APL for the pixel data to be written into the second pixel area CA every frame period (step S301).

The timing controller 130 compares the average luminance of the second pixel area CA with a preset threshold value (step S302). When the average luminance of the second pixel area CA is greater than the threshold value, the timing controller 130 compensates the luminance of the second pixel area CA by improving the luminance of the second pixel area CA (steps S302 and S303). In this case, the image reproduced in the second pixel area CA is a bright image with high luminance. As in the above-described embodiments, the luminance of the second pixel area CA may be compensated by a method of applying the compensation voltage Vdata' to the second gate electrodes GE2 of the driving elements DT2 disposed in the second pixel area CA. The power supply unit 150 or the data driver 110 outputs the compensation voltage Vdata' under the control of the timing controller 130.

The timing controller 130 does not compensate for the luminance of the second pixel area CA when the average luminance of the second pixel area CA is less than or equal to the threshold value (step S304). In this case, the image reproduced in the second pixel area CA is a low luminance image that is relatively dark compared to a high luminance image. In step S304, the power supply unit 150 or the data driver 110 does not output the compensation voltage Vdata' under the control of the timing controller 130. Accordingly, in step S304, the second gate electrodes GE2 of the driving elements DT2 disposed in the second pixel area CA may be floated since the compensation voltage Vdata' is not applied thereto.

Figure 31:
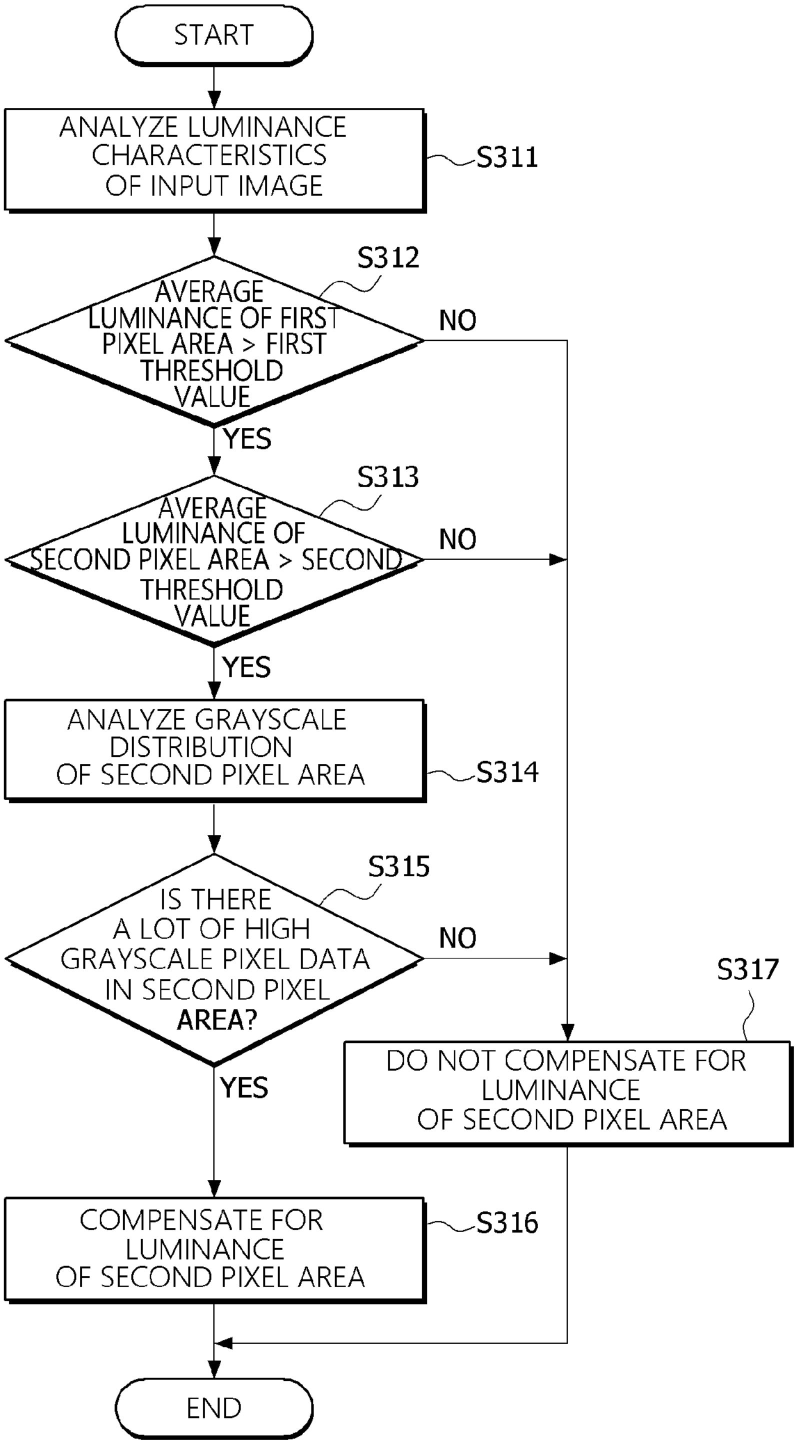
FIG. 31 is a flowchart showing a method of compensating for luminance of a screen according to a third embodiment of the present disclosure.

FIG. 31 is a flowchart showing a method of compensating for luminance of a screen according to a third embodiment of the present disclosure.

Referring to FIG. 31, the timing controller 130 analyzes the luminance characteristics of the input image based on a result of calculating APL for one frame data every frame period (step S311).

The timing controller 130 compares the average luminance of the first pixel area DA with a first threshold value, and compares the average luminance of the second pixel area CA with a second threshold value (steps S312 and S313).

When the average luminance of the first pixel area DA is greater than the first threshold value and the average luminance of the second pixel area CA is greater than the second threshold value, the timing controller 130 analyzes the grayscale distribution of the second pixel area CA by using the histogram calculation result (step S314). The timing controller 130 may determine the grayscale distribution characteristics of the pixel data to be written into the second pixel area CA by calculating the number of accumulated pixels for each grayscale in the second pixel area CA.

The timing controller 130 may determine whether the dominant grayscale of the second pixel area CA is a high grayscale by comparing the number of pixels with high grayscale equal to or greater than a predetermined reference value, among the pixel data to be written into the second pixel area CA, with a preset third threshold value. When the number of pixels with high grayscale equal to or greater than the reference value is greater than the third threshold value, that is, when it is determined that the high grayscale is dominant in view of the grayscale distribution characteristics of the second pixel area, the timing controller 130 compensates for the luminance of the second pixel area CA by improving the luminance of the second pixel area CA (steps S315 and S316). In this case, the image reproduced in the second pixel area CA is an image containing many high-luminance pixels, as in an example of a histogram shown in FIG. 33C. As in the above-described embodiments, the luminance of the second pixel area CA may be compensated by a method of applying the compensation voltage Vdata' to the second gate electrodes GE2 of the driving elements DT2 disposed in the second pixel area CA.

The timing controller 130 does not compensate for the luminance of the second pixel area CA when the average luminance of the first pixel area DA is less than or equal to the first threshold value or the average luminance of the second pixel area CA is less than or equal to the second threshold value (step S317). Further, even though the average luminance of the second pixel area CA is high, if the high grayscale pixel data is small, the luminance of the second pixel area CA is not compensated (step S317).

Figure 32:
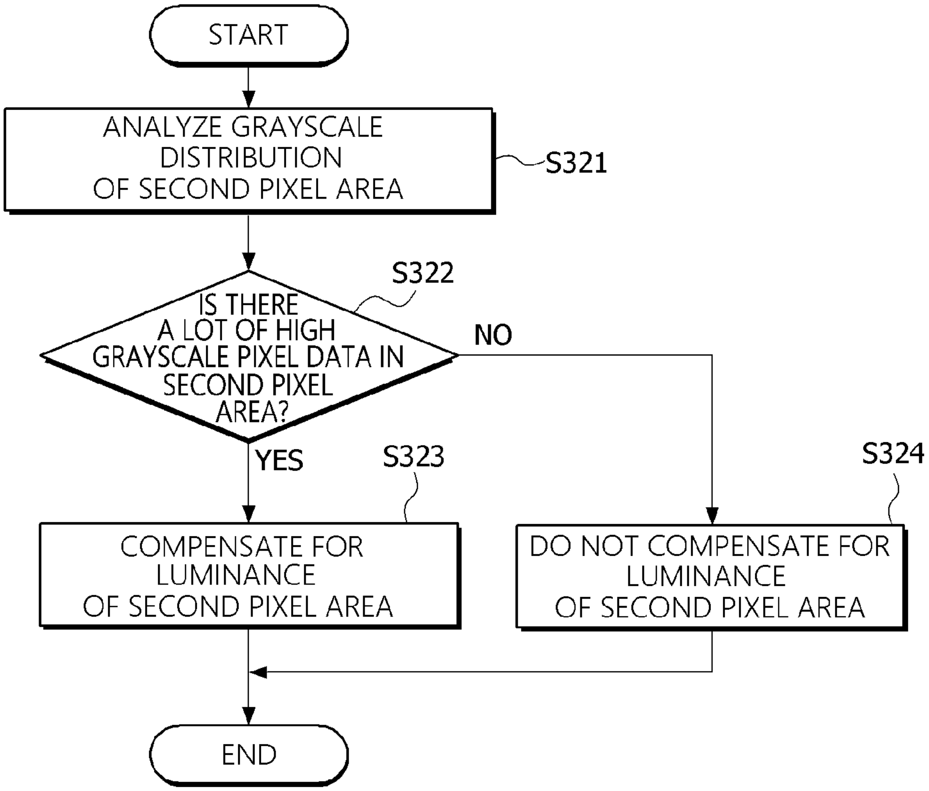
FIG. 32 is a flowchart showing a method of compensating for luminance of a screen according to a fourth embodiment of the present disclosure.

FIG. 32 is a flowchart illustrating a method of compensating for luminance of a screen according to a fourth embodiment of the present disclosure. In this embodiment, without analyzing the luminance characteristics of the input image, it is determined whether or not to compensate the luminance of the second pixel area CA based on the grayscale distribution characteristics of the pixel data to be written into the pixels of the second pixel area CA.

Referring to FIG. 32, the timing controller 130 analyzes the grayscale distribution of the second pixel area CA by using the histogram calculation result for the pixel data to be written into the second pixel area CA every frame period (step S321).

Figure 33A:
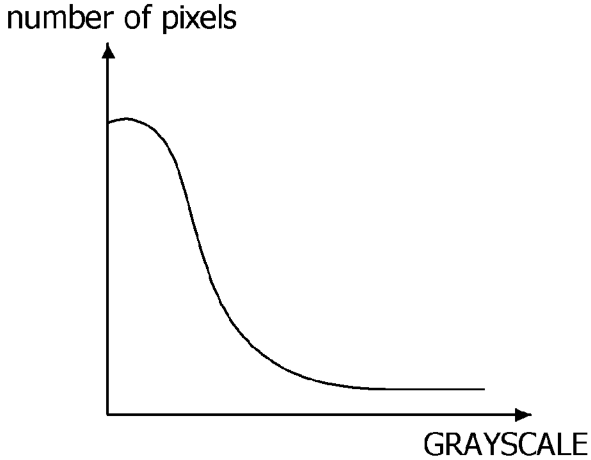
FIGS. 33A, 33B, and 33C are diagrams showing examples of histogram calculation results for pixel data.
Figure 33B:
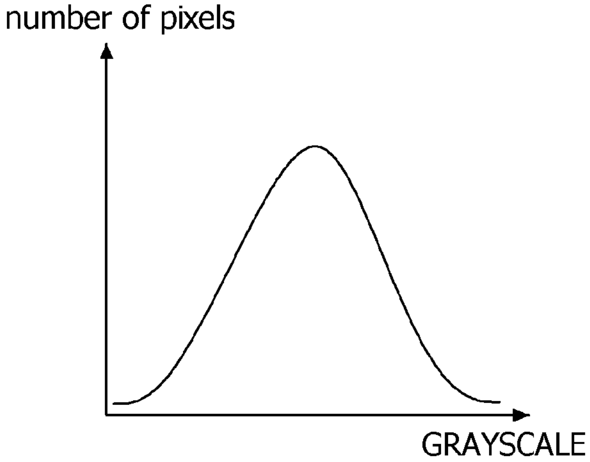
Figure 33C:
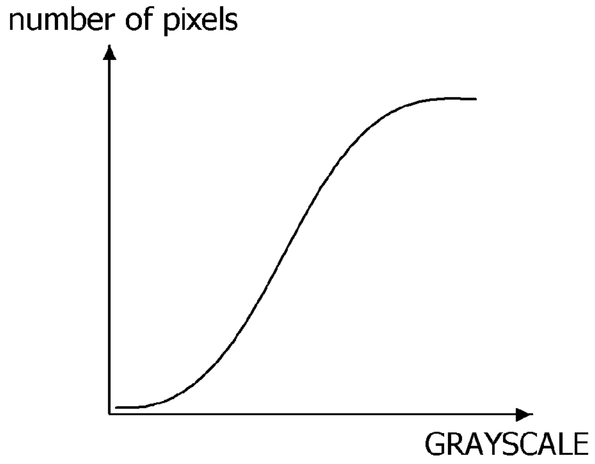

As shown in FIG. 33C, when the high grayscale pixel data, among the pixel data to be written to the pixels of the second pixel area CA, is greater than a third threshold value, timing controller 130 compensates the luminance of the second pixel area CA by improving the luminance of the second pixel area CA (steps S322 and S323). On the other hand, when the high grayscale pixel data, among the pixel data to be written to the pixels of the second pixel area CA, is less than or equal to the third threshold value, the timing controller 130 does not compensate for the luminance of the second pixel area CA (step S317). In addition, even though the average luminance of the second image CA is high, if the number of high luminance pixels is small, the luminance of the second pixel area CA is not compensated (step S324).

FIGS. 33A, 33B, and 33C are diagrams illustrating an example of a histogram calculation result for pixel data. FIG. 33A is an example of a low grayscale image having many accumulated values of pixel data having a low grayscale value; FIG. 33B is an example of an image having many accumulated values of pixel data having an intermediate grayscale value; and FIG. 33C is an example of a high grayscale image with many accumulated values of pixel data having a high grayscale value.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display panel comprising:

a first pixel area in which pixels are arranged; and a second pixel area in which pixels having a resolution or pixels per inch less than a resolution or pixels per inch of the first pixel area are arranged, wherein each of the pixels in the first pixel area includes a first driving transistor configured to drive a light emitting element, and each of the pixels in the second pixel area includes a second driving transistor configured to drive a light emitting element, wherein the second driving transistor includes a first gate electrode, a second gate electrode, a first electrode, and a second electrode, a data voltage of pixel data to be written to a pixel of the second pixel area is applied to the first gate electrode of the second driving transistor through a data line, and a compensation voltage for increasing luminance of the second pixel area is applied to the second gate electrode of the second driving transistor, wherein the first driving transistor includes:

a first gate electrode and a second gate electrode;

a first electrode to which a pixel driving voltage is applied; and a second electrode connected to an anode electrode of the light emitting element, and wherein the pixel driving voltage is applied to the second gate electrode of the first driving transistor.

2. The display panel of claim 1, wherein a data voltage of pixel data to be written to a pixel in the first pixel area is applied to the first gate electrode of the first driving transistor.

3. The display panel of claim 1, further comprising:

an auxiliary data line connected to the second gate electrode of the second driving transistor, the auxiliary data line configured to apply the compensation voltage to the second gate electrode of the second driving transistor.

4. The display panel of claim 3, wherein the auxiliary data line is connected to the second gate electrode of the second driving transistor through a contact hole penetrating an insulating layer.

5. The display panel of claim 3, wherein in the second pixel area, the auxiliary data line connected to the pixels in the second pixel area are connected to each other.

6. The display panel of claim 1, wherein each of the pixels in the second pixel area further includes a switch element configured to apply the compensation voltage to the second gate electrode of the second driving transistor.

7. The display panel of claim 1, wherein each of the pixels in the first pixel area and each of the pixels in the second pixel area includes a plurality of sub-pixels having different colors, the second pixel area includes an auxiliary data line connected to the second gate electrode of the second driving transistor, the auxiliary data line configured to apply the compensation voltage to the second gate electrode of the second driving transistor, and the auxiliary data line is separated for each color of the sub-pixels in the second pixel area and is connected to the second gate electrode of the second driving transistor disposed in the sub-pixels in the second pixel area.

8. A display device comprising:

a display panel including a first pixel area in which pixels are arranged and a second pixel area in which pixels having a resolution or pixels per inch less than a resolution or pixels per inch of the first pixel area are arranged;

a data driver configured to convert pixel data of an input image into a data voltage and supply the data voltage to data lines connected to the pixels in the first pixel area and the pixels in the second pixel area; and a luminance compensation unit configured to generate a compensation voltage for increasing luminance of the second pixel area, wherein the compensation voltage is applied to the pixels in the second pixel area, wherein each of the pixels in the first pixel area includes a first driving transistor configured to drive a light emitting element, and each of the pixels in the second pixel area includes a second driving transistor configured to drive a light emitting element, wherein the second driving transistor includes a first gate electrode, a second gate electrode, a first electrode, and a second electrode, wherein a data voltage of pixel data to be written to the pixel of the second pixel area is applied to the first gate electrode of the second driving transistor through a data line, wherein the compensation voltage for increasing the luminance of the second pixel area is applied to the second gate electrode of the second driving transistor, and wherein the first driving transistor includes:

a first gate electrode and a second gate electrode;

a first electrode to which a pixel driving voltage is applied; and a second electrode connected to an anode electrode of the light emitting element, and wherein the pixel driving voltage is applied to the second gate electrode of the first driving transistor.

9. The display device of claim 8, wherein the data driver includes:

a plurality of first channels configured to output the data voltage to data lines of the first pixel area; and a plurality of second channels configured to output the data voltage to data lines of the second pixel area, and wherein the plurality of first channels and the plurality of second channels have a same output voltage range, a voltage range of the data voltage outputted from the plurality of first channels and the plurality of second channel is the same within the output voltage range, the output voltage range of the plurality of first channels and the plurality of second channels includes a voltage margin greater than the voltage range of the data voltage, and a voltage margin less than the voltage range of the data voltage, the voltage margin of the plurality of first channels and the plurality of second channel is the same.

10. The display device of claim 8, wherein the compensation voltage is a specific voltage or is variable depending on luminance characteristics and grayscale distribution characteristics of the input image.

11. The display device of claim 8, wherein the compensation voltage is commonly applied to the pixels arranged in the second pixel area.

12. The display device of claim 8, wherein the compensation voltage is separated for each color of sub-pixels arranged in the second pixel area and applied to the pixels in the second pixel area.

13. The display device of claim 12, wherein the compensation voltage is set differently for each color of the sub-pixels arranged in the second pixel area.

14. The display device of claim 8, wherein when an average luminance of the input image to be displayed in the first pixel area and the second pixel area is greater than a preset threshold value, the compensation voltage is applied to the pixels in the second pixel area.

15. The display device of claim 8, wherein when an average luminance of the input image to be displayed in the first pixel area and the second pixel area is greater than a preset threshold value, and among the pixel data to be written into the second pixel area, a number of pixels of high grayscale equal to or greater than a preset reference value is greater than or equal to a predetermined threshold value, the compensation voltage is applied to the pixels in the second pixel area.

16. The display device of claim 8, wherein when an average luminance of the input image to be displayed in the second pixel area is greater than a preset threshold value, the compensation voltage is applied to the pixels in the second pixel area.

17. The display device of claim 8, wherein when an average luminance of the input image to be displayed in the second pixel area is greater than a preset threshold value, and among the pixel data to be written into the second pixel area, a number of pixels of high grayscale equal to or greater than a preset reference value is greater than or equal to a predetermined threshold value, the compensation voltage is applied to the pixels in the second pixel area.

18. The display device of claim 8, wherein when, among the pixel data to be written into the second pixel area, a number of pixels of high grayscale equal to or greater than a preset reference value is greater than or equal to a predetermined threshold value, the compensation voltage is applied to the pixels in the second pixel area.

19. The display device of claim 9, further comprising:

a power supply unit configured to generate a gamma reference voltage, wherein each of the plurality of first channels and the plurality of second channels of the data driver includes a digital-to-analog converter configured to convert the pixel data into the data voltage by using a gamma compensation voltage for each gray scale divided from the gamma reference voltage, and the power supply unit or the data driver includes the luminance compensation unit to output the compensation voltage.

* * * * *